(12) United States Patent
Woo et al.

(10) Patent No.: US 11,991,421 B2
(45) Date of Patent: May 21, 2024

(54) ELECTRONIC DEVICE AND METHOD FOR PROCESSING VOICE INPUT AND RECORDING IN THE SAME

(71) Applicant: SAMSUNG ELECTRONICS CO., LTD., Suwon-si (KR)

(72) Inventors: Kyounggu Woo, Suwon-si (KR); Hoseon Shin, Suwon-si (KR); Chulmin Lee, Suwon-si (KR); Youngwoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 155 days.

(21) Appl. No.: 17/686,901

(22) Filed: Mar. 4, 2022

(65) Prior Publication Data

US 2022/0286757 A1 Sep. 8, 2022

Related U.S. Application Data

(63) Continuation of application No. PCT/KR2022/002638, filed on Feb. 23, 2022.

(30) Foreign Application Priority Data

Mar. 5, 2021 (KR) .................. 10-2021-0029462

(51) Int. Cl.
*H04N 21/81* (2011.01)
*G06F 9/451* (2018.01)
(Continued)

(52) U.S. Cl.
CPC ......... *H04N 21/8106* (2013.01); *G06F 9/453* (2018.02); *G10L 15/26* (2013.01); *G11B 27/031* (2013.01)

(58) Field of Classification Search
CPC ..... H04N 21/8106; G06F 9/453; G10L 15/26; G10L 2015/088; G11B 27/031
(Continued)

(56) References Cited

U.S. PATENT DOCUMENTS 8,948,568 B2  2/2015  Jackson et al.
9,269,350 B2  2/2016  Schuster et al.
(Continued)

FOREIGN PATENT DOCUMENTS

JP            3513030       1/2004
KR      10-2010-0031245    3/2010
(Continued)

OTHER PUBLICATIONS

Search Report and Written Opinion issued Jun. 2, 2022 in counterpart International Patent Application No. PCT/KR2022/002638.

*Primary Examiner* — Helen Shibru
(74) *Attorney, Agent, or Firm* — NIXON & VANDERHYE P.C.

(57) ABSTRACT

An electronic device according to various embodiments includes: a microphone, a memory, and a processor, wherein the memory stores instructions which, when executed, cause the processor to: control the electronic device to copy a signal acquired from the microphone, record a first signal, and perform voice recognition on a second signal based on a recording operation using the microphone being executed, determine an editing section including unnecessary information in the first signal based on a voice recognition result for the second signal, and generate recording data by editing the unnecessary information included in the determined editing section in the first signal.

20 Claims, 13 Drawing Sheets

(51) Int. Cl.
*G10L 15/26* (2006.01)
*G11B 27/031* (2006.01)

(58) Field of Classification Search
USPC .......................................................... 386/278
See application file for complete search history.

(56) References Cited

U.S. PATENT DOCUMENTS

| | | | | |
|---|---|---|---|---|
| 11,386,912 | B1* | 7/2022 | Slotznick | H04M 3/568 |
| 11,631,406 | B2* | 4/2023 | Kim | G10L 15/08 |
| | | | | 704/251 |
| 11,715,469 | B2* | 8/2023 | Sharma | G10L 15/16 |
| | | | | 704/235 |
| 11,862,178 | B2* | 1/2024 | Shin | G10L 17/18 |
| 2010/0128145 | A1 | 5/2010 | Pitts et al. | |
| 2012/0210228 | A1 | 8/2012 | Wang et al. | |
| 2013/0297308 | A1 | 11/2013 | Koo et al. | |
| 2015/0089002 | A1 | 3/2015 | Shima | |
| 2018/0260169 | A1 | 9/2018 | Chang et al. | |
| 2018/0366161 | A1 | 12/2018 | Gilley | |
| 2020/0349947 | A1 | 11/2020 | Kim et al. | |

FOREIGN PATENT DOCUMENTS

| | | |
|---|---|---|
| KR | 10-2018-0046780 | 5/2018 |
| KR | 10-1877559 | 7/2018 |
| KR | 10-1977072 | 5/2019 |
| KR | 10-2019-0090424 | 8/2019 |

* cited by examiner

[1202]

User utterance: Hi, Bixby, stop recording a video

ELECTRONIC DEVICE AND METHOD FOR PROCESSING VOICE INPUT AND RECORDING IN THE SAME

CROSS-REFERENCE TO RELATED APPLICATIONS

This application is a continuation of International Application No. PCT/KR2022/002638 designating the United States, filed on Feb. 23, 2022, in the Korean Intellectual Property Receiving Office and claiming priority to Korean Patent Application No. 10-2021-0029462, filed on Mar. 5, 2021, in the Korean Intellectual Property Office, the disclosures of which are incorporated by reference herein in their entireties.

BACKGROUND

Field

Embodiments of the disclosure relate to an electronic device and a method of simultaneously processing recording and a voice input in an electronic device.

Description of Related Art

Recently, various functions of electronic devices can be provided to users through voice recognition (or speech recognition). A voice recognition module (for example, a voice recognition engine or a voice agent) may control an application or a function installed in the electronic device and provide various voice recognition-based services to the user.

A signal which an electronic device acquires from a microphone may be used as a voice input and also used for recording (for example, voice recording or video recording) using a microphone signal.

When the electronic device does not support simultaneous operations of recording processing and voice recognition processing and the electronic device starts a recording function, an audio path of a microphone signal switches for recording processing, and thus a voice recognition function cannot be processed during recording execution. Accordingly, the electronic device may execute the recording function through a voice input but has a problem in that an input (for example, selection of an end menu) should be manually made when recording ends.

When the electronic device supports multi-tasking of recording processing and voice recognition processing, the electronic device may call a voice assistance in a recording signal, and thus a voice for a voice command (for example, Hi, Bixby, end video recording or Hi, Bixby, show me a picture) may also be recorded. It may be cumbersome for a user to edit information on a voice input unnecessarily recorded in an audio signal or a recorded video.

SUMMARY

Embodiments of the disclosure provide a method of addressing the problem in which unnecessary information (for example, a voice command or private information) which the user does not desire is also recorded when voice recognition and recording are simultaneously performed.

An electronic device according to various example embodiments includes: a microphone, a memory, and a processor, wherein the memory stores instructions which, when executed, cause the processor to: control the electronic device to copy a signal acquired from the microphone, control the electronic device to record a first signal, and perform voice recognition on a second signal based on a recording operation using the microphone being executed, determine an editing section including unnecessary information in the first signal based on a voice recognition result for the second signal, and generate recording data by editing the unnecessary information included in the determined editing section in the first signal.

A method of processing a recording and a voice input by an electronic device according to various example embodiments includes: copying a signal acquired from the microphone, recording a first signal, and performing voice recognition on a second signal based on a recording operation being executed, determining an editing section including unnecessary information in the first signal based on a voice recognition result for the second signal and storing recording data by editing the unnecessary information included in the determined editing section in the first signal.

According to various example embodiments, it is possible to implement an audio path to perform multi-tasking of recording and voice recognition based on a microphone input and detect start and end locations of a voice command and a user's intent to edit or remove unnecessary information in a final recording file, so as to reduce a time during which the user edits the final recording file.

According to various example embodiments, it is possible to provide an environment in which a recording file suitable for the user's intent can be stored by removing or editing an unnecessary section (for example, a voice command or private information) included in the microphone signal according to an automatic or user option.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

Figure 1:
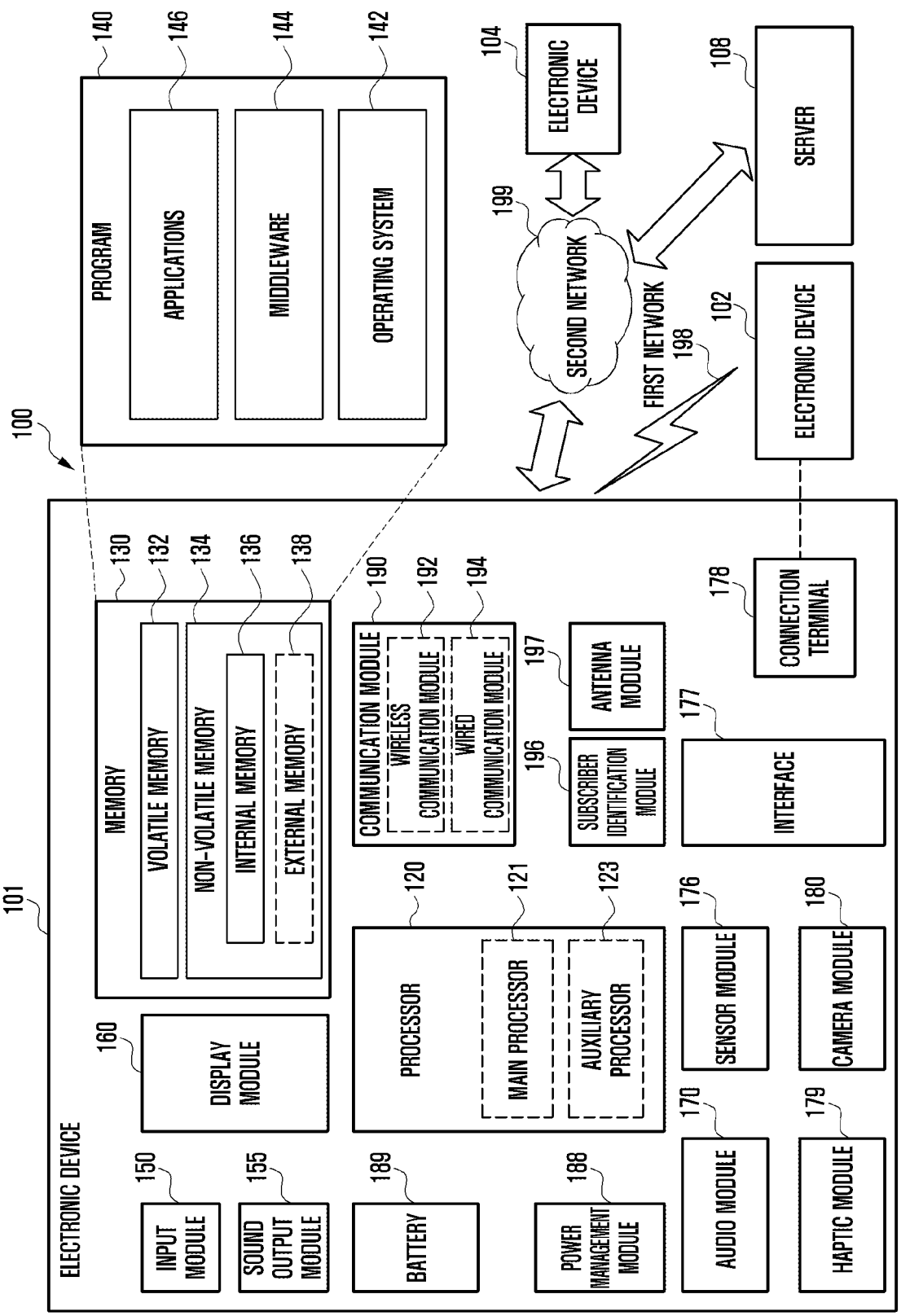
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
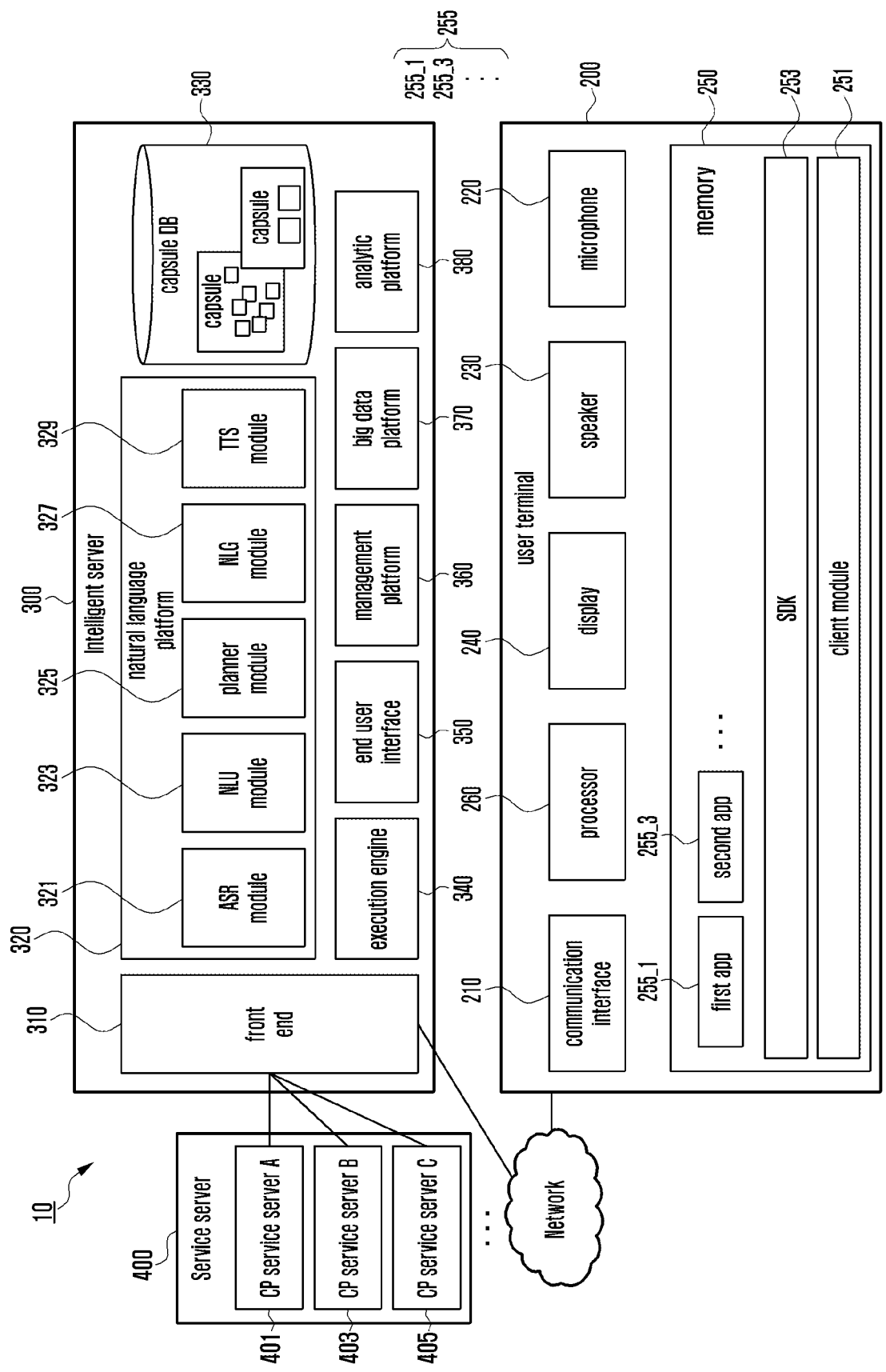
FIG. 2 is a block diagram illustrating an example configuration of an integrated intelligence system according to various embodiments.

FIG. 2 is a block diagram illustrating an example configuration of an integrated intelligence system according to various embodiments.

Referring to FIG. 2, the integrated intelligence system 300 according to an embodiment may include a user terminal 200, an intelligent server 300, and a service server 400.

According to an embodiment, the user terminal 200 may be a terminal device (or electronic device) that can be connected to the Internet, for example, a mobile phone, a smartphone, a personal digital assistant (PDA), a notebook computer, a TV, a domestic appliance, a wearable device, an HMD, a smart speaker, etc.

According to an embodiment, the user terminal 200 (e.g., the electronic device 101 of FIG. 1) may include a communication interface (e.g., including communication circuitry) 210, a microphone 220, a speaker 230, a display 240, a memory 250, and a processor 260. The listed components may be operatively or electrically connected to each other.

According to an embodiment, the communication interface 210 may be configured to be connected to an external device to transmit and receive data. According to an embodiment, the microphone 220 may receive a sound (e.g., a user's utterance) and may convert the sound into an electrical signal. According to an embodiment, the speaker 230 may output an electrical signal as a sound (e.g., a voice). According to an embodiment, the display 240 may be configured to display an image or a video. According to an embodiment, the display 240 may display a graphic user interface (GUI) of an executed application (or application program).

According to an embodiment, the memory 250 may store a client module 251, a software development kit (SDK) 253, and a plurality of applications 255_1 and 255_3. The client module 251 and the SDK 253 may form a framework (or a solution program) for performing a general-purpose function. In addition, the client module 251 or the SDK 253 may form a framework for processing a voice input.

According to an embodiment, the plurality of applications 255_1 and 255_3 in the memory 250 may be programs for performing a designated function. According to an embodiment, the plurality of applications 255_1 and 255_3 may include a first application 255_1 and a second application 255_3. According to an embodiment, each of the plurality of applications 255_1 and 255_3 may include a plurality of operations for performing a designated function. For example, the plurality of applications 255_1 and 255_3 may include at least one of an alarm application, a message application, and a schedule application. According to an embodiment, the plurality of applications 255_1 and 255_3 may be executed by the processor 260 to sequentially execute at least some of the plurality of operations.

According to an embodiment, the processor 260 may control the overall operation of the user terminal 200. For example, the processor 260 may be electrically connected to the communication interface 210, the microphone 220, the speaker 230, the display 240, and the memory 250 to perform a designated operation.

According to an embodiment, the processor 260 may also execute a program stored in the memory 250 to perform a designated function. For example, the processor 260 may execute at least one of the client module 251 or the SDK 253 to perform the following operation for processing a voice input. The processor 260 may control the operation of the plurality of applications 255_1 and 255_3, for example, through the SDK 253. An operation to be described below as the operation of the client module 251 or the SDK 253 may be an operation by execution by the processor 260.

According to an embodiment, the client module 251 may receive a voice input. For example, the client module 251 may generate a voice signal corresponding to a user's utterance detected through the microphone 220. The client module 251 may transmit the received voice input to the intelligent server 300. According to an embodiment, the client module 251 may transmit state information about the user terminal 200, together with the received voice input, to the intelligent server 300. The state information may be, for example, execution state information about an application.

According to an embodiment, the client module 251 may receive a result corresponding to the received voice input. For example, the client module 251 may receive the result corresponding to the received voice input from the intelligent server 300. The client module 251 may display the received result on the display 240.

According to an embodiment, the client module 251 may receive a plan corresponding to the received voice input. The client module 251 may display a result of executing a plurality of operations of an application according to the plan on the display 240. For example, the client module 251 may sequentially display results of executing the plurality of operations on the display. In another example, the user terminal 200 may display only some (e.g., a result of executing the last operation) of the results of executing the plurality of operations on the display.

According to an embodiment, the client module 251 may receive a request for obtaining information required to produce the result corresponding to the voice input from the intelligent server 300. The information required to produce the result may be, for example, state information about an electronic device. According to an embodiment, the client module 251 may transmit the required information to the intelligent server 300 in response to the request.

According to an embodiment, the client module 251 may transmit information about the result of executing the plurality of operations according to the plan to the intelligent server 300. The intelligent server 300 may identify that the received voice input has been properly processed using the information about the result.

According to an embodiment, the client module 251 may include a voice recognition module. According to an embodiment, the client module 251 may recognize a voice input for performing a limited function through the voice recognition module. For example, the client module 251 may perform an intelligent application for processing a voice input for performing an organic operation through a designated input (e.g., Wake up!). The client module 251 may recognize a call utterance (e.g., Hi Bixby) in an audio signal received from the microphone 220 and may start an AI agent service in response to the call utterance.

According to an embodiment, the intelligent server 300 (e.g., the server 108 of FIG. 1) may receive information relating to a user voice input from the user terminal 200 through a communication network. According to an embodiment, the intelligent server 300 may change data relating to the received voice input into text data. According to an embodiment, the intelligent server 300 may generate, based on the text data, a plan for performing a task corresponding to the user voice input.

According to an embodiment, the plan may be generated by an artificial intelligence (AI) system. The artificial intelligence system may be a rule-based system or a neural network-based system (e.g., a feedforward neural network (FNN)), or a recurrent neural network (RNN). The artificial intelligence system may be a combination of the above systems or a different artificial intelligence system. According to an embodiment, the plan may be selected from a set of predefined plans, or may be generated in real time in response to a user request. For example, the artificial intelligence system may select at least one plan from among a plurality of predefined plans.

According to an embodiment, the intelligent server 300 may transmit a result obtained according to the generated plan to the user terminal 200 or may transmit the generated plan to the user terminal 200. According to an embodiment, the user terminal 200 may display the result obtained according to the plan on the display 240. According to an embodiment, the user terminal 200 may display a result of executing an operation according to the plan on the display.

According to an embodiment, the intelligent server 300 may include a front end 310, a natural language platform (e.g., including various module, each including various processing circuitry and/or executable program instructions) 322, a capsule DB 330, an execution engine 340, an end user interface 350, a management platform 360, a big data platform 370, and an analytic platform 380. As used herein, the term module may be understood to include various processing circuitry and/or executable program instructions According to an embodiment, the front end 310 may receive a voice input received from the user terminal 200. The front end 310 may transmit a response corresponding to the voice input.

According to an embodiment, the natural language platform 320 may include an automatic speech recognition module (ASR module) 321, a natural language understanding module (NLU module) 323, a planner module 325, a natural language generator module (NLG module) 327, and a text-to-speech module (TTS module) 329.

According to an embodiment, the ASR module 321 may convert a voice input received from the user terminal 200 into text data.

According to an embodiment, the NLU module 323 may understand a user's intent using the text data of the voice input. For example, the NLU module 323 may understand the user's intent by performing a syntactic analysis or a semantic analysis. According to an embodiment, the NLU module 323 may understand the meaning of a word extracted from the voice input using a linguistic feature (e.g., a syntactic element) of a morpheme or phrase and may determine the user's intent by matching the understood meaning of the word to intent.

According to an embodiment, the planner module 325 may generate a plan using the intent determined by the NLU module 323 and a parameter. According to an embodiment, the planner module 325 may determine a plurality of domains necessary to perform a task based on the determined intent. The planner module 325 may determine a plurality of operations respectively included in the plurality of domains determined based on the intent. According to an embodiment, the planner module 325 may determine a parameter required to execute the plurality of determined operations or a result value output by executing the plurality of operations. The parameter and the result value may be defined as a concept related to a designated format (or class). Accordingly, the plan may include the plurality of operations determined by the intent of the user and a plurality of concepts. The planner module 325 may determine a relationship between the plurality of operations and the plurality of concepts by stages (or hierarchically). For example, the planner module 325 may determine the execution order of the plurality of operations, determined based on the user's intent, based on the plurality of concepts. That is, the planner module 325 may determine the execution order of the plurality of operations, based on the parameter required to execute the plurality of operations and the result output by executing the plurality of operations. Accordingly, the planner module 325 may generate a plan including association information (e.g., ontology) between the plurality of operations and the plurality of concepts. The planner module 325 may generate a plan using information stored in a capsule DB 330 in which a set of relationships between concepts and operations is stored.

According to an embodiment, the NLG module 327 may change designated information into a text form. The information changed into the text form may be in the form of a natural language utterance.

According to an embodiment, the TTS module 329 may change information in the text form into information in a voice form.

According to an embodiment, the capsule DB 330 may store information about a relationship between a plurality of concepts and a plurality of operations corresponding to a plurality of domains. For example, the capsule DB 330 may store a plurality of capsules including a plurality of action objects (or pieces of action information) and a plurality of concept objects (or pieces of concept information) of a plan. According to an embodiment, the capsule DB 330 may store the plurality of capsules in the form of a concept action network (CAN). According to an embodiment, the plurality of capsules may be stored in a function registry included in the capsule DB 330.

According to an embodiment, the capsule DB 330 may include a strategy registry that stores strategy information required to determine a plan corresponding to a voice input. The strategy information may include reference information for determining one plan when there is a plurality of plans corresponding to the voice input. According to an embodiment, the capsule DB 330 may include a follow-up registry that stores information about a follow-up for suggesting a follow-up to the user in a specified situation. The follow-up may include, for example, a following utterance. According to an embodiment, the capsule DB 330 may include a layout registry that stores layout information about information output through the user terminal 200. According to an embodiment, the capsule DB 330 may include a vocabulary registry that stores vocabulary information included in capsule information. According to an embodiment, the capsule DB 330 may include a dialog registry that stores information about a dialog (or interaction) with the user.

According to an embodiment, the capsule DB 330 may update a stored object through a developer tool. The developer tool may include, for example, a function editor for updating an action object or a concept object. The developer tool may include a vocabulary editor for updating vocabulary. The developer tool may include a strategy editor for generating and registering a strategy for determining a plan. The developer tool may include a dialog editor that generates a dialog with the user. The developer tool may include a follow-up editor capable of activating a following target and editing a following utterance providing a hint. The following target may be determined based on a currently set target, user preference, or an environmental condition.

According to an embodiment, the capsule DB 330 can also be implemented in the user terminal 200. That is, the user terminal 200 may include the capsule DB 330 that stores information for determining an operation corresponding to a voice input.

According to an embodiment, the execution engine 340 may produce a result using the generated plan. According to an embodiment, the end user interface 350 may transmit the produced result to the user terminal 200. Accordingly, the user terminal 200 may receive the result and may provide the received result to the user. According to an embodiment, the management platform 360 may manage information used in the intelligent server 300. According to an embodiment, the big data platform 370 may collect user data. According to an embodiment, the analytic platform 380 may manage the quality of service (QoS) of the intelligent server 300. For example, the analytic platform 380 may manage a component and the processing speed (or efficiency) of the intelligent server 300.

According to an embodiment, the service server 400 may provide a designated service (e.g., a food delivery service or a hotel reservation service) to the user terminal 200. According to an embodiment, the service server 400 may be a server operated by a third party. For example, the service server 400 may include a first service server 401, a second service server 403, and a third service server 405 that are operated by different third parties. According to an embodiment, the service server 400 may provide information for generating a plan corresponding to a received voice input to the intelligent server 300. The provided information may be stored, for example, in the capsule DB 330. In addition, the service server 400 may provide result information according to the plan to the intelligent server 300.

In the foregoing integrated intelligent system 300, the user terminal 200 may provide various intelligent services to the user in response to a user input. The user input may include, for example, an input through a physical button, a touch input, or a voice input.

In an embodiment, the user terminal 200 may provide a voice recognition service through an intelligent application (or voice recognition application) stored therein. In this case, for example, the user terminal 200 may recognize a user utterance or a voice input received through the microphone and may provide a service corresponding to the recognized voice input to the user.

In an embodiment, the user terminal 200 may perform a designated operation alone or together with the intelligent server 300 and/or the service server 400, based on the received voice input. For example, the user terminal 200 may execute an application corresponding to the received voice input and may perform the designated operation through the executed application.

In an embodiment, when the user terminal 200 provides a service together with the intelligent server 300 and/or the service server 400, the user terminal 200 may detect a user utterance using the microphone 220 and may generate a signal (or voice data) corresponding to the detected user speech. The user terminal 200 may transmit the voice data to the intelligent server 300 using the communication interface 210.

According to an embodiment, the intelligent server 300 may generate, as a response to voice input received from the user terminal 200, a plan for performing a task corresponding to the voice input or a result of performing an operation according to the plan. The plan may include, for example, a plurality of operations for performing the task corresponding to the user's voice input and a plurality of concepts related to the plurality of operations. The concepts may define a parameter input to execute the plurality of operations or a result value output by executing the plurality of operations. The plan may include information about an association between the plurality of operations and the plurality of concepts.

According to an embodiment, the user terminal 200 may receive the response using the communication interface 210.

The user terminal 200 may output an audio signal generated inside the user terminal 200 to the outside using the speaker 230 or may output an image generated inside the user terminal 200 to the outside using the display 240.

Figure 3:
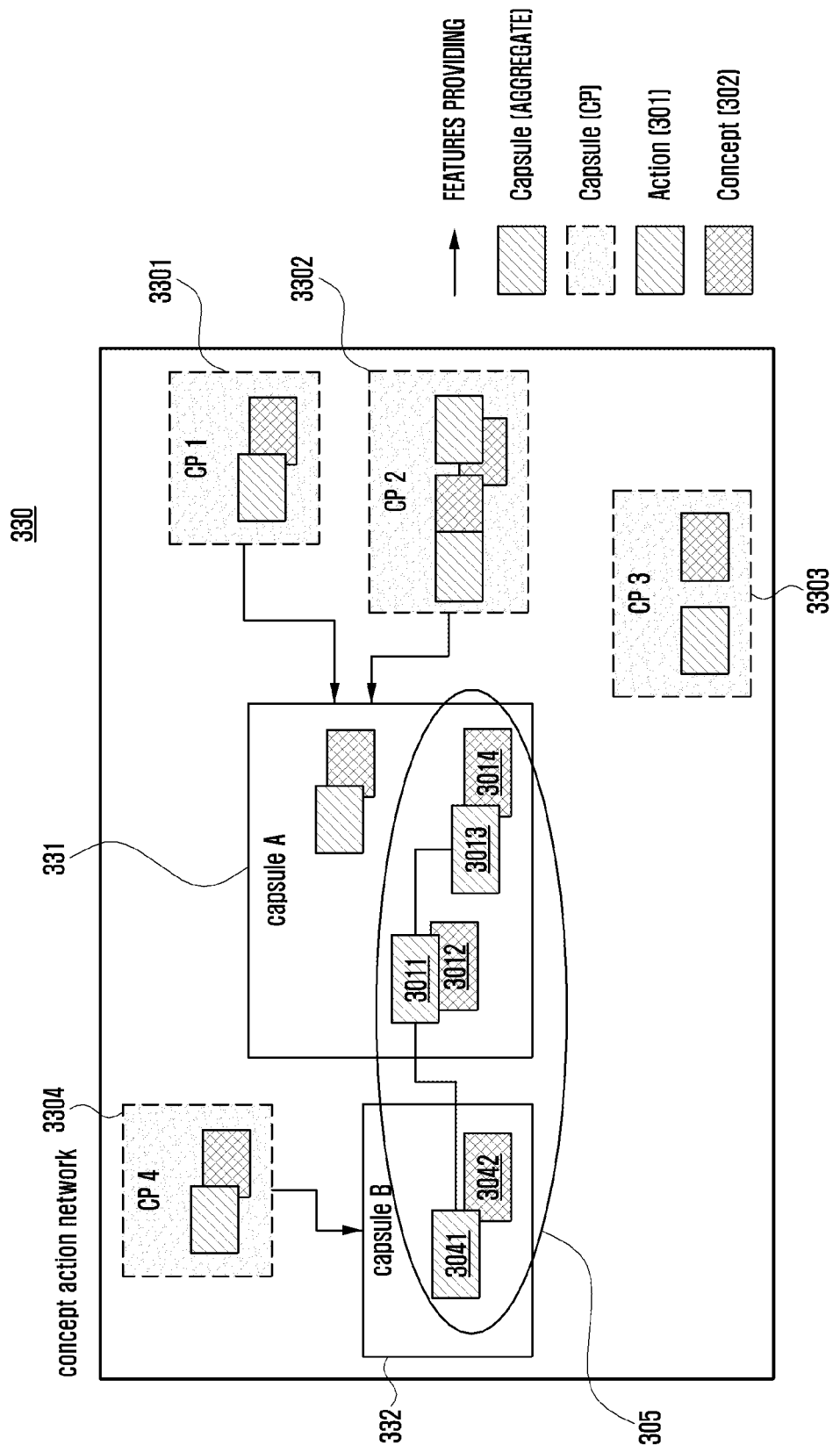
FIG. 3 is a diagram illustrating an example form in which information about a relationship between a concept and an action is stored in a database according to various embodiments.

FIG. 3 is a diagram illustrating an example form in which information about a relationship between a concept and an action is stored in a database according to various embodiments.

A capsule DB (e.g., the capsule database DB 330) of the intelligent server 300 may store a capsule in the form of a concept action network (CAN). The capsule DB may store an operation of processing a task corresponding to a voice input from a user and a parameter required for the operation in the form of a concept action network (CAN). The CAN may show a systematic relationship between an action and a concept defining a parameter required to perform the action.

The capsule DB 330 may store a plurality of capsules (e.g., capsule A 331 and capsule B 332) respectively corresponding to a plurality of domains (e.g., applications). According to an embodiment, one capsule (e.g., capsule A 331) may correspond to one domain (e.g., application). Further, one capsule may correspond to at least one service provider (e.g., CP 1 3301, CP 2 3302, CP 3 3303, or CP 4 3304) for performing a function for a domain related to the capsule. According to an embodiment, one capsule may include at least one action 301 and at least one concept 302 for performing a specified function.

According to an embodiment, the natural language platform 320 may generate a plan for performing a task corresponding to a received voice input using a capsule stored in the capsule DB 330. For example, the planner module 325 of the natural language platform 320 may generate the plan using the capsule stored in the capsule DB 330. For example, the planner module 325 may generate a plan 305 using actions 3011 and 3013 and concepts 3012 and 3014 of capsule A 331 and an action 3041 and a concept 3042 of capsule B 332.

Figure 4:
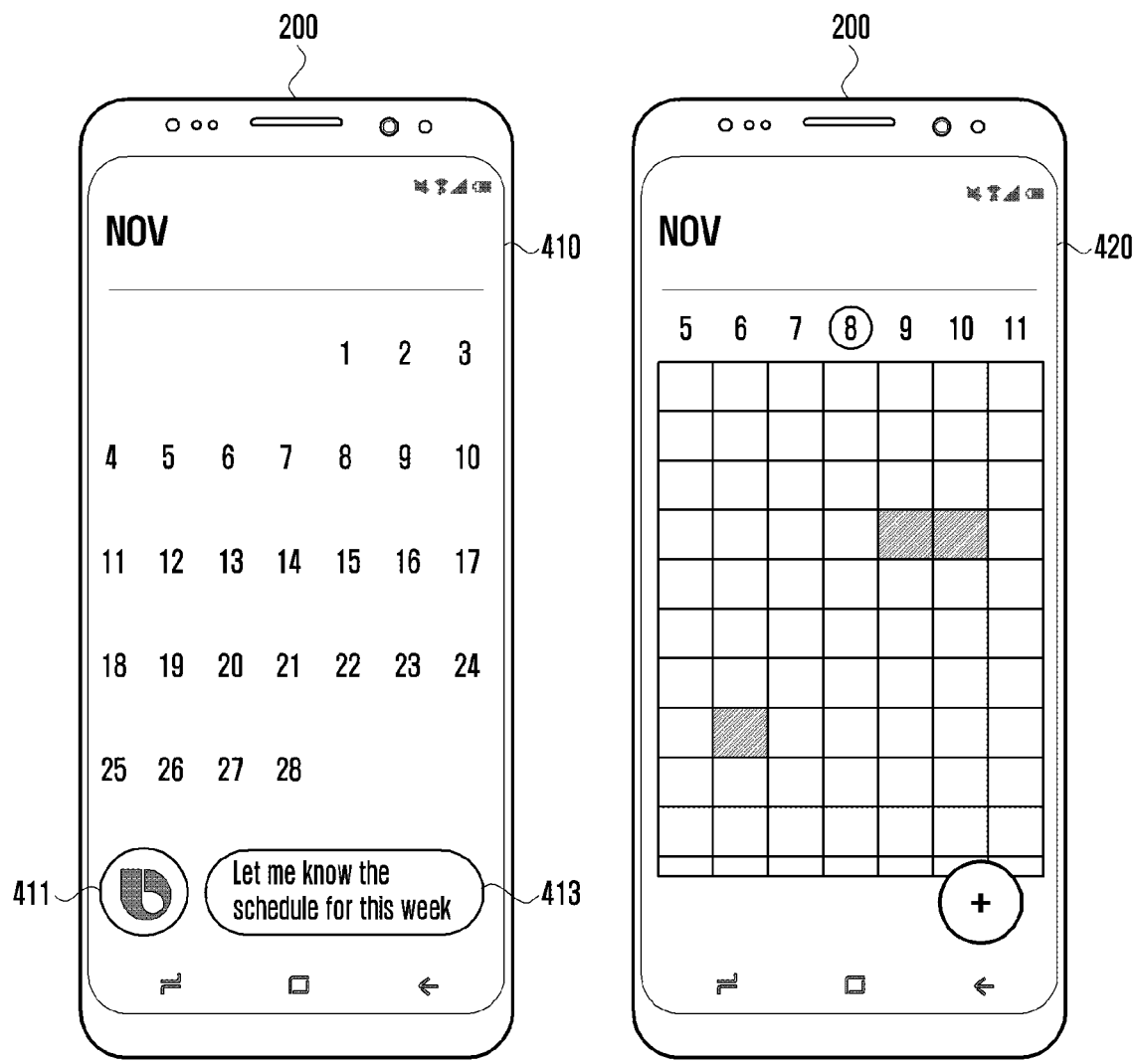
FIG. 4 is a diagram illustrating an example screen for a user terminal to process a received voice input through an intelligent application according to various embodiments.

FIG. 4 is a diagram illustrating an example screen for a user terminal to process a received voice input through an intelligent application according to various embodiments.

The user terminal 200 may execute an intelligent application to process a user input through the intelligent server 300.

According to an embodiment, when recognizing a designated voice input (e.g., Wake up!) or receiving an input via a hardware key (e.g., a dedicated hardware key), the user terminal 200 may execute the intelligent application for processing the voice input on screen 410. For example, the user terminal 200 may execute the intelligent application in a state in which a schedule application is executed. According to an embodiment, the user terminal 200 may display an object (e.g., an icon) 411 corresponding to the intelligent application on the display 230. According to an embodiment, the user terminal 200 may receive a voice input based on a user utterance. For example, the user terminal 200 may receive a voice input "Tell me the schedule for this week!" According to an embodiment, the user terminal 200 may display a user interface (UI, e.g., an input window) 413 of the intelligent application displaying text data of the received voice input on the display.

According to an embodiment, the user terminal 200 may display a result corresponding to the received voice input on screen 420 on the display. For example, the user terminal 200 may receive a plan corresponding to the received user input and may display "Schedule for this week" according to the plan on the display.

Figure 5:
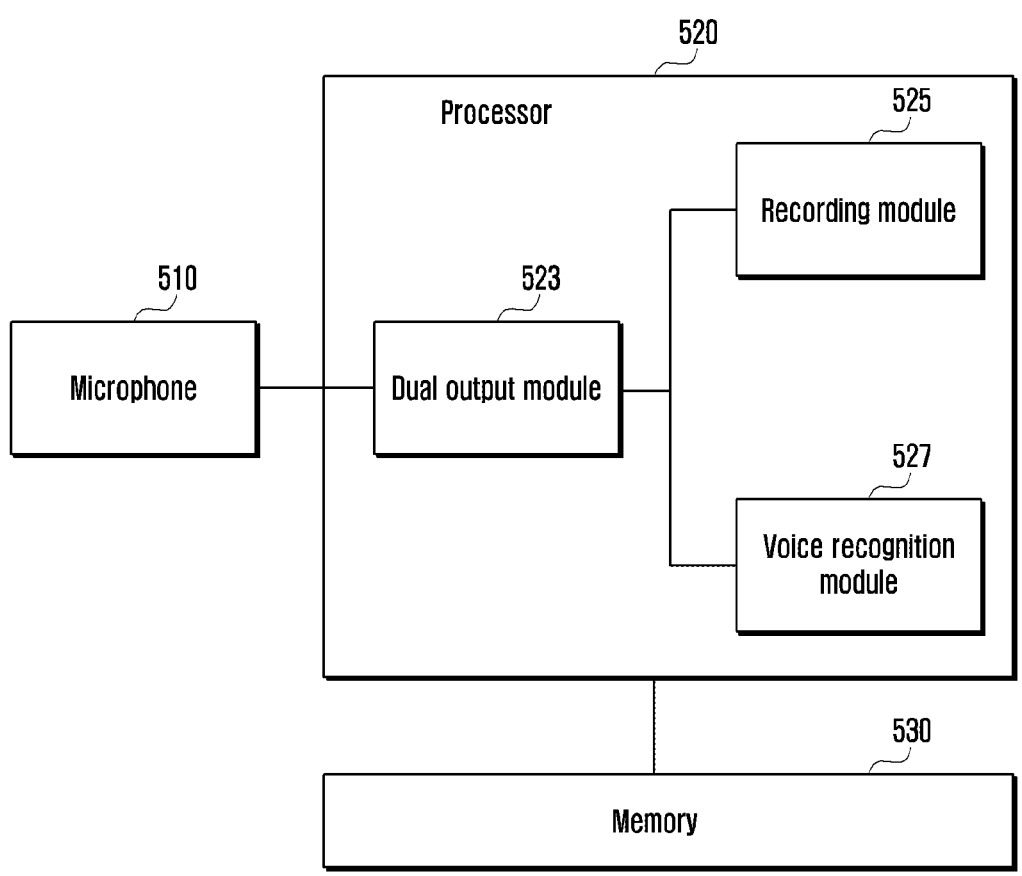
FIG. 5 is a block diagram illustrating an example configuration of an electronic device according to various embodiments.

FIG. 5 is a block diagram illustrating an example configuration of an electronic device according to various embodiments.

Referring to FIG. 5, according to an embodiment, the electronic device 101 (for example, the electronic device 101 of FIG. 1 or the UE 200 of FIG. 2) may include a microphone 510 (for example, the input module 150 of FIG. 1), a processor (e.g., including processing circuitry) 520 (for example, the processor 120 of FIG. 1 or the processor 260 of FIG. 2), and a memory 530 (for example, the memory 130 of FIG. 1). The electronic device 101 may further include at least one some of the elements and/or functions of the electronic device 101 of FIG. 1 or the UE 200 of FIG. 2, and may include elements overlapping the elements of FIG. 1 or FIG. 2.

The microphone 510 may include one or a plurality of microphone arrays. The microphone 510 may acquire a signal (for example, a background sound or a voice signal) (hereinafter, referred to as a microphone signal) corresponding to a sound acquired from the outside and transfer the same to the processor 520.

For example, the microphone 510 may acquire a user's voice utterance signal. The voice utterance may include at least one of a wakeup utterance (for example, hi, Bixby or hi, Google) for calling a voice assistance, a control command utterance (for example, record a sound, record a video, and take a picture) for instructing function execution, and a chatbot utterance. The microphone 510 may acquire a background noise signal as well as the voice utterance signal.

The processor 520 (for example, the processor 120 of FIG. 1) may include various processing circuitry and process data on a recording operation and a voice recognition operation of the electronic device 101 and control the signal flow between internal elements of the electronic device 101. The memory 530 may be operatively connected to the processor 520 and may store various instructions that can be executed by the processor 520. The instructions may be defined on a framework stored in the memory 530.

Hereinafter, an operation in which the processor 520 actually simultaneously performs a recording operation and a voice recognition operation based on an input of the microphone 510 and editing unnecessary information included in recording data is described in greater detail, and operations of the processor 520 described below may be performed by loading instructions stored in the memory 530.

According to an embodiment, the processor 520 may include a dual output module (e.g., including various processing circuitry and/or executable program instructions) 523, a recording module (e.g., including various processing circuitry and/or executable program instructions) 525, and a voice recognition module (e.g., including various processing circuitry and/or executable program instructions) 527. The processor 520 may control operations of the modules 523, 525, and 527. The modules 523, 525, and 527 may be implemented as software (or programs) but may be implemented as a separate hardware component or a combination of software and hardware components.

According to an embodiment, the processor 520 may include various processing circuitry and control the recording module 525 and the voice recognition module 527 to actually simultaneously operate in response to execution (or start) of a recording function. The processor 520 may start recording a microphone signal and actually simultaneously control the voice recognition module 257 to operate in the background while displaying a user interface screen for a recording execution environment on a display (for example, the display module 160 of FIG. 1 or the display 230 of FIG. 2).

The processor 320 may control output of the microphone signal (input S) transmitted from the microphone 510 through the dual output module 523. The dual output module 523 may copy and process the signal (input S) acquired from the microphone 510 on the basis of start of the recording function and provide a first microphone signal (for example, input S) to the recording module 523 and a second microphone signal (for example, input S) to the voice recognition module 527. According to various embodiments, the dual output module 523 may buffer a microphone signal (for example, a microphone signal of an external electronic device received through a communication module) transmitted from an external device, and then copy and process the buffered signal in response to start of the recording function.

For example, a camera application may make a request for an audio path connection for the microphone signal to the processor 520 in response to start of video recording. The processor 520 may provide the first microphone signal to the recording module 525 through the dual output module 523 and the second microphone signal to the voice recognition module 527 to process voice recognition.

According to various embodiments, the dual output module 523 may control audio paths through switches. For example, the dual output module 523 may control switches to connect the audio path between the application and the microphone 510 for which the connection is requested on the basis of the request for the connection to the microphone 510 from the application (for example, camera app or voice recording app).

The recording module 525 may control a recording operation according to the request from the application (for example, camera app or voice recording app) and generate recording data on the basis of the first microphone signal. The recording module 525 may temporarily store the recording data and control a post-processing edition operation according to activation/deactivation of a post-processing edition function.

According to an embodiment, when a voice recording process is executed, the recording module 525 may encode and merge the first microphone signal (for example, input S) received from the microphone 510 to generate recording data (for example, audio recording data).

According to various embodiments, when a video recording execution process is executed, the recording module 525 may encode and merge the first microphone signal (for example, input S) received from the microphone 510 and a video signal received from a camera module (for example, the camera module 180 of FIG. 1) to generate recording data (for example, video recording data).

The recording module 525 may receive resultant information obtained by processing the second microphone signal from the voice recognition module 527 and determine whether unnecessary information (for example, a voice control command utterance or private information) is included in the recording data.

The recording module 525 may identify configuration information for a function of editing unnecessary information, edit the unnecessary information in the recording data according thereto, and generate edited recording data.

According to an embodiment, the electronic device 101 may support activation (or turning on settings) or deactivation (or turning off settings) for the function of editing unnecessary information in connection with recording. For example, the electronic device 101 may provide an item of configuring the function of editing unnecessary information to the user interface screen of the application (for example, voice recording app or camera app) supporting the recording function. The user may select the item of configuring the function of editing unnecessary information or release the selection to activate or deactivate the function of editing unnecessary information.

According to various embodiments, the electronic device 101 may support activation and deactivation of the function of editing unnecessary information in connection with recording and support editing of recording data by automatic (auto)/user setting (manual) options when the editing function is activated.

For example, the electronic device 101 may provide a menu item for editing unnecessary information to the user interface screen of the application (for example, voice recording app or camera app) supporting the recording function. The user may enter a mode for configuring the function of editing unnecessary information or a screen for configuring the function of editing information through the menu item for editing unnecessary information. For example, the mode for configuring the function of editing unnecessary information may include an item for selecting activation and deactivation of the function of editing unnecessary information, an item for selecting auto editing or manual editing when the function is activated, items for selecting an editing processing scheme, and items for selecting an editing processing option for private information.

The editing processing scheme may include at least one of an audio blocking scheme (for example, mute/keep all signals), a voice reduction scheme (for example, remove speech only), an audio volume reduction scheme, or a scheme of removing all signals (for example, remove all signals). The audio blocking scheme may be a scheme for muting all of voices and background sounds including unnecessary information and maintaining recorded signal sections in the whole recording data. The voice reduction scheme may be a scheme for reducing a volume of a voice signal in a section including unnecessary information and maintaining a background sound in the whole recording data. The audio volume reduction scheme may be a scheme for reducing volumes of both voices and background sounds in sections including unnecessary information in the whole recording data. The scheme for removing all signals may be a scheme for removing data (for example, at least one piece of audio and video data) in sections including unnecessary information in the whole recording data.

For example, the electronic device 101 may provide the menu item for editing unnecessary information (for example personalized edit object) to the camera setting option of the camera application and support a configuration of the editing function through on/off items of the menu item for editing unnecessary information. The electronic device 101 may display a configuration screen for editing unnecessary information on the display in response to selection of the menu item for editing unnecessary information (for example, personalized edit object).

The configuration screen for editing unnecessary information may include a screen for configuring on/off of the editing function and a screen for configuring the editing processing scheme. The screen for configuring the editing processing scheme may include, for example, items for selecting activation/deactivation of an automatic editing (for example, auto) option for allowing the user to select the editing processing scheme, an option for removing all signals (for example, remove all signals), a voice reduction (for example, remove speech only) option, an audio volume reduction option, or an audio blocking (for example, mute/keep all signals) option. The editing processing option is described as an example but is not limited thereto.

In another example, the electronic device 101 may provide an icon for editing unnecessary information to the camera application screen and switch to the configuration screen for editing unnecessary information in response to selection of the icon for editing unnecessary information by the user.

For example, when the editing processing scheme is the scheme for removing all signals during audio recording, the recording module 525 may delete audio data in sections including unnecessary information from the whole audio data. In another example, when the editing processing scheme is the scheme for removing all signals during video recording, the recording module 525 may delete not only audio data in sections including unnecessary information but also video data from the whole audio and video data. When the editing processing scheme is the audio blocking scheme, the voice reduction scheme, or the audio volume reduction scheme during video recording, the recording module 525 may maintain video data and edit audio data.

When the function of editing unnecessary information is configured to be deactivated in connection with recording, the post-processing edition operation may be skipped in the recording data.

When the function of editing unnecessary information is activated in connection with recording, the recording module 525 may edit unnecessary information and private information in the recording data according to the configured editing processing scheme.

According to an embodiment, when the function of editing unnecessary information is configured as the automatic processing option, the recording module 525 may edit unnecessary information and private information in the temporarily stored recording data according to the configured editing processing scheme and store the same. For example, in the automatic processing option, the audio blocking scheme may be configured by default but can be changed.

According to various embodiments, the recording module 525 may provide a user interface screen (or popup window) for asking about whether to edit unnecessary information in response to a request for recording termination (or stop), edit unnecessary sections in the recording data in response to reception of a user approval input, and store the same. When a user rejection input is received by the user interface screen, the recording module 525 may store non-edited recording data.

According to an embodiment, when the function of editing unnecessary information is configured as the manual option, the recording module 525 may edit at least one piece of unnecessary information and private information in the recording data according to the user setting (manual) option and store the same.

For example, the user may make the following utterance during recording.

Examples of recording text for user utterance:

"Hello. A today's topic to review is new smart speaker Galaxy Home mini of Samsung. "Hi, Bixby, read mail" ⊙ ⊙ That's it for the review. "Hi, Bixby, stop recording a video"

The electronic device 101 may record an audio signal for a user utterance voice and a background sound on the basis of the first signal, process voice recognition on the basis of the second signal, and recognize a wakeup utterance and a control command utterance input of "Hi, Bixby, read mail" and "Hi, Bixby, stop recording a video". The electronic device 101 may determine sections of Hi, Bixby, read mail" and "Hi, Bixby, stop recording a video" as editing sections including unnecessary information and edit "Hi, Bixby, read mail" and "Hi, Bixby, stop recording a video" in the recording data through the audio blocking scheme.

Examples of recording text edited through audio blocking scheme:

"Hello. A today's review is new smart speaker Galaxy Home mini of Samsung. (background sound is maintained) That's it for the review."

The voice recognition module 527 may perform the overall operation related to a voice assistant (or intelligent app, voice recognition app, or intelligent agent). The voice recognition module 527 may be implemented as a separate independent module (for example, voice agent) or may be implemented as one of functions provided by the application (for example, an app in app module (for example, key utterance module)).

The voice recognition module 527 may preprocess the signal acquired from the microphone 510 (for example, remove noise or improve the voice signal) to detect a voice, recognize the detected voice, and process a function corresponding to the recognized voice input.

The voice recognition module 527 may preprocess the second microphone signal transmitted from the dual output module 523 to extract a voice utterance signal and perform voice recognition on the basis of the extracted voice utterance signal. The voice recognition module 527 may recognize at least one of a wakeup utterance, a configured keyword utterance, or a control command utterance.

For example, the voice recognition module 527 may process the following utterance in response to reception of a keyword utterance. The voice recognition module 527 may perform at least one of language processing for the signal received from the microphone 510 (for example, automatic speech recognition (ASR) (for example, the automatic speech recognition module 321 of FIG. 2), natural language understanding (NLU) (for example, the natural language understanding module 323 of FIG. 2), natural language generation (NLG) (for example, the natural language generation module 327), text to speech (TTS) (for example, the text to speech conversion module 329 of FIG. 2), or end point detection (EPD)) to control execution of a function corresponding to the voice input.

The voice recognition module 527 may generate voice recognition processing result information for the second microphone signal transmitted from the dual output module 523 during recording and provide the same to the recording module 525 (or application performing the recording operation). For example, the processing result information may include at least one piece of voice utterance time information, utterance start point and end point information, text to speech (TTS) start and end information, automatic speech recognition (ASR) result information, or natural language result information (for example, private information).

According to various embodiments, the voice recognition module 527 may process a user utterance input through a link with a server (for example, intelligent server). The electronic device 101 may transmit data related to the utterance input to the server and receive the recognition result for the utterance input from the server.

According to various example embodiments, an electronic device (for example, the electronic device 101 of FIG. 1, the UE 200 of FIG. 2, or the electronic device 101 of FIG. 5) may include: a microphone (for example, the microphone 510 of FIG. 5), a memory (for example, the memory 130 of FIG. 1 or the memory 530 of FIG. 5), and a processor (for example, the processor 120 of FIG. 1 or the processor 520 of FIG. 5), wherein the memory stores instructions which, when executed, cause the processor to: control the electronic device to copy a signal acquired from the microphone, record a first signal, and perform voice recognition on a second signal based on a recording operation being executed using the microphone, determine an editing section including unnecessary information in the first signal based on a voice recognition result for the second signal, and generate recording data by editing the unnecessary information included in the determined editing section in the first signal.

According to various example embodiments, the editing section including the unnecessary information may include at least one of a wakeup utterance input section, a control command utterance input section, and a private information utterance section.

According to various example embodiments, the recording operation may include at least one of an audio recording operation or a video recording operation.

According to various example embodiments, the memory may further include instructions which, when executed, cause the processor to provide a configuration object supporting activation and deactivation of a function of editing unnecessary information to a user interface screen.

According to various example embodiments, the memory may further include instructions which, when executed, cause the processor to perform editing such that a total length of the first signal is maintained and both a voice and a background sound in an editing section including unnecessary information are muted.

According to various example embodiments, the memory may further include instructions which, when executed, cause the processor to: perform editing such that a total length of the first signal is maintained and a volume of a voice signal is reduced and a background sound is maintained in the editing section including unnecessary information in the first signal.

According to various example embodiments, the memory may further include instructions which, when executed, cause the processor to: perform editing such that all pieces of data in the editing section including the unnecessary information are deleted from a total length of the first signal.

According to various example embodiments, the memory may further include instructions which, when executed, cause the processor to: provide a user interface screen related to a configuration for editing the unnecessary information to a display, and edit the unnecessary information in the determined editing section in the first signal through an editing processing scheme selected by a user input.

According to various example embodiments, the memory may further include instructions which, when executed, cause the processor to: control the display to display a guidance user interface for selecting approval or rejection of editing of the unnecessary information in response to reception of a recording end request, and edit the unnecessary information in the first signal in response to reception of an editing approval input.

Figure 6:
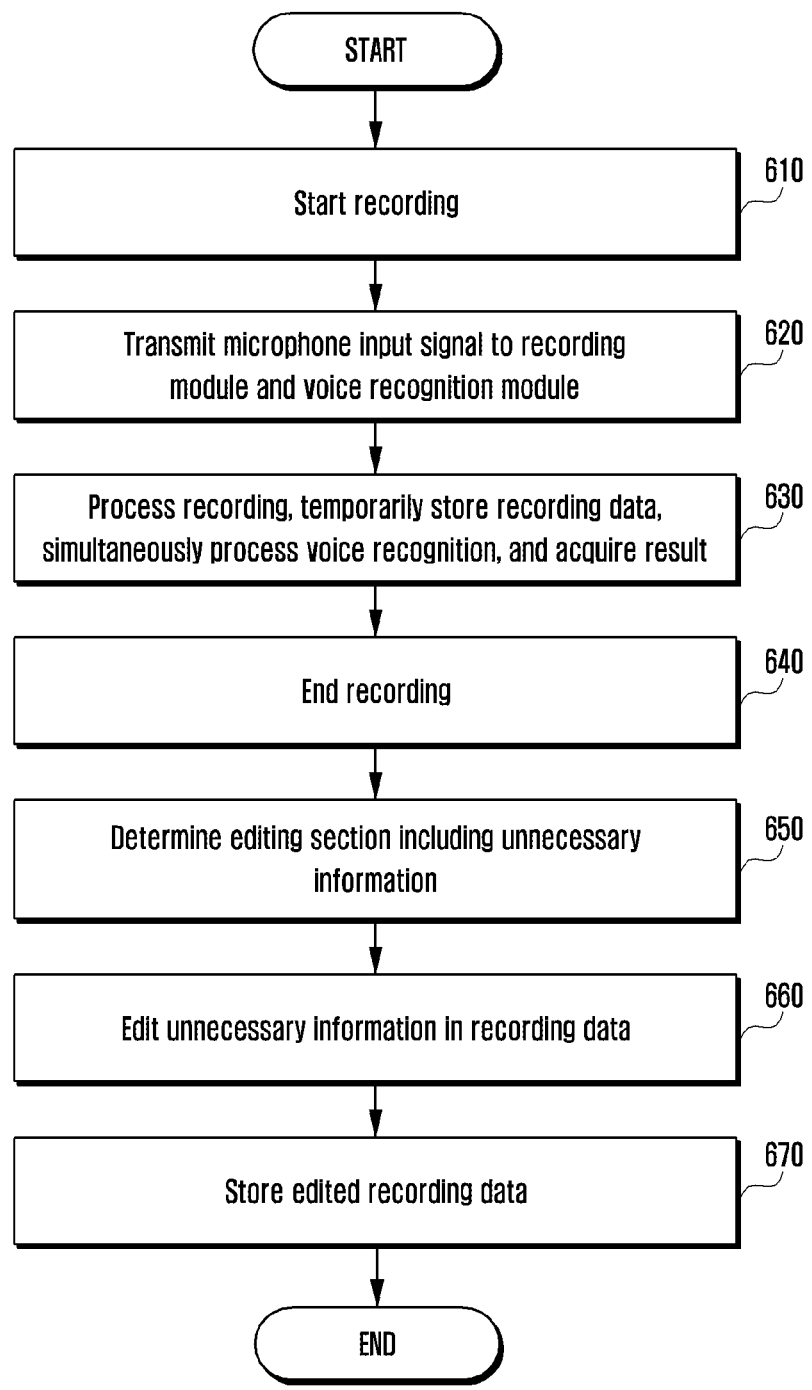
FIG. 6 is a flowchart illustrating an example method by which the electronic device processes recording and a voice input according to various embodiments.

FIG. 6 is a flowchart illustrating an example method by which the electronic device processes recording and a voice input according to various embodiments.

Referring to FIG. 6, in operation 610, a processor (for example, the processor 120 of FIG. 1, the processor 260 of FIG. 2, or the processor 520 of FIG. 5) of the electronic device 101 according to an embodiment may start the recording operation (for example, recording or recording start).

According to an embodiment, the processor 520 may execute an application (for example, camera app or recording app) related to recording on the basis of a user input and start the recording operation. The processor 520 may control a recording module (for example, the recording module 525 of FIG. 5) and a voice recognition module (for example, the voice recognition module 527 of FIG. 5) to actually simultaneously operate in response to start of the recording operation.

For example, the processor 520 may call a voice assistant on the basis of recognition of a wakeup call utterance (for example, Hi, Bixby) for calling the voice assistant and start a recording execution process in response to recognition of a recording execution voice control command (for example, record).

In another example, the processor 520 may actually simultaneously perform recording and voice recognition for a condition of start of the recording function by another user input (in other words, a video recording menu touch input or a voice recording menu touch input).

In operation 620, the processor 520 may control the signal acquired from a microphone (for example, the microphone 510 of FIG. 5) to be dually output (e.g., transmitted) to the recording module and the voice recognition module.

For example, the processor 520 may copy the signal acquired from the microphone and transmit the first microphone signal to the recording module and the second microphone signal to the voice recognition module.

In operation 630, the processor 520 may perform recording through the recording module on the basis of the first microphone signal to generate recording data, temporarily store the recording data and actually simultaneously process voice recognition on the basis of the second microphone signal through the voice recognition module, and acquire the processing result.

For example, the processor 520 may process voice recognition on the basis of the second microphone signal through the voice recognition module and recognize at least one of a wakeup utterance, a voice control command utterance, and private information. The processor 520 may identify at least one of a start time and an end time of a wakeup utterance according to voice recognition processing, wakeup utterance text information, a start time and an end time of a voice control command utterance, control command utterance text information, a time including private information, private information text information, or ASR processing result information.

In operation 640, the processor 520 may receive a recording end request.

In operation 650, the processor 520 may reflect the voice recognition processing result to identify unnecessary information (for example, a voice command or private information) included in recording data and determine an editing section including unnecessary information.

For example, the processor 520 may compare the recording data generated on the basis of the first microphone signal with the voice recognition result information processed on the basis of the second microphone signal, determine at least one of a wakeup utterance section, a control command utterance section, or a section including private information in the recording data, and determine an unnecessary editing section.

In operation 660, the processor 520 may edit unnecessary information included in the editing section included in the recording data.

For example, the processor 520 may edit the unnecessary editing section included in the recording data according to a designated editing scheme. The editing processing scheme may include at least one of an audio blocking scheme, a voice reduction scheme, an audio volume reduction scheme, or a scheme for removing all signals.

According to an embodiment, the processor 520 may edit all of voices and background sounds in the section including unnecessary information to be muted in the whole recording data.

According to an embodiment, the processor 520 may perform editing such that a volume of a voice signal in the section including unnecessary information is reduced and the background sound is maintained in the whole recording data.

According to an embodiment, the processor 520 may perform editing such that volumes of both the voice and the background sound in the section including unnecessary information are reduced in the whole recording data.

According to an embodiment, the processor 520 may perform editing such that data in the section including unnecessary information (for example, at least one piece of audio and video data) is removed from the whole recording data.

The electronic device 101 may variously configure the editing processing scheme (for example, automatic processing/user setting processing), and a detailed description of editing processing is made with reference to the following drawings.

In operation 670, the processor 520 may store edited recording data.

Although not illustrated, according to various embodiments, the processor 520 may provide a user interface screen (or popup window) for asking about whether to edit unnecessary information in response to a request for recording termination, edit unnecessary sections in the recording data in response to reception of a user approval input, and store the same. When a user rejection input is received by the user interface screen, the recording module 525 may store non-edited recording data.

Figure 7:
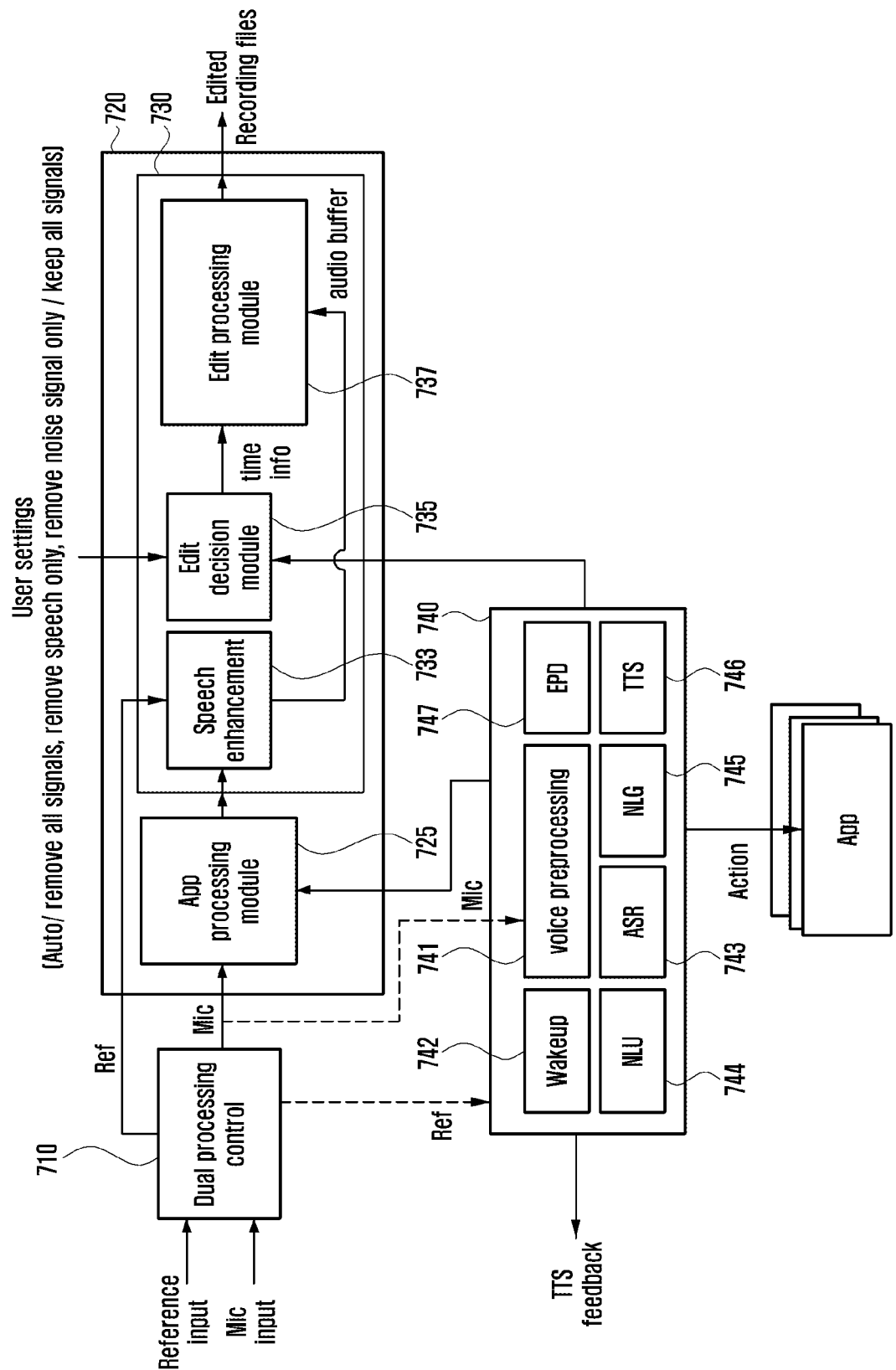
FIG. 7 is a block diagram illustrating a configuration of an example process of an electronic device for processing recording and a voice input according to various embodiments.

FIG. 7 is a diagram illustrating an example process of an electronic device for processing recording and a voice input according to various embodiments.

Referring to FIG. 7, the electronic device 101 according to an embodiment may include a processor (for example, the processor 520 of FIG. 5), a dual output processing module 710 (for example, the dual output module 523 of FIG. 5), a recording module 720 (for example, the recording module 525 of FIG. 5), and a voice agent 740 (for example, the voice recognition module 527 of FIG. 5).

The processor 520 may transfer a microphone signal (mic input) to the dual output module 710 in response to start of a recording operation. The dual output module 710 may copy the microphone signal and dually process the signal.

The dual output module 710 may copy the signal transmitted from the microphone and provide a first microphone signal (for example, first mic input) to the recording module 720 and a second microphone signal (for example, second mic input) to the voice agent 740.

According to an embodiment, the dual output module 710 may copy a reference signal (for example, reference input) for performing voice processing on the signal transmitted from the microphone and provide a first reference signal to a speech enhancement module 733 and a second reference signal to a voice agent 740.

The voice agent 740 may process the second microphone signal and recognize a voice input (or utterance input). The voice agent 740 may control execution of a function for the voice input. The voice agent 740 may include at least one of a voice preprocessing module 741, a wakeup module 742, an automatic speech recognition (ASR) module 743, a natural language understanding (NLU) module 744, a natural language generator (NLG) module 745, a text to speech (TTS) module 746, or an end point detection (EPD) module 747.

The voice preprocessing module 741 may remove noise for the second microphone phone and perform and/or process voice signal enhancement in order to recognize a keyword or a wakeup utterance.

The wakeup module 742 may extract a predetermined keyword or wakeup utterance from the signal processed by the voice preprocessing module 741 and recognize a keyword or a wakeup utterance input. In addition, the wakeup module 742 may verify the keyword or the wakeup utterance input.

The ASR module 743 may convert the recognized utterance input into text data expressed in a predetermined language. For example, the ASR module 743 may generate text data using a sound model and a language model. The sound model may include information related to vocalization, and the language model may include unit phoneme information and information on a combination of unit phoneme information.

The NLU module 744 may detect a user's intent for the text data generated by the ASR module 743 or detect a matching domain. The NLU module 744 may include a plurality of natural language processing models. For example, the NLU module 744 may detect a user's intent by performing syntactic analysis or semantic analysis. For example, the NLU module 744 may detect a meaning of a word extracted from the voice input on the basis of linguistic features (for example, grammatical features) and match the detected meaning with the intent to determine the user's intent.

In addition, the NLU module 744 may determine a plurality of domains for performing a function (or task) using the determined intent and a parameter.

The NLG module 745 may generate data made during natural language processing in a natural language form.

According to various embodiments, the NLG module 745 may generate the execution result of the control operation corresponding to a control command utterance (for example, record a voice, record a video, and take a picture) indicating function execution, input after a wakeup utterance (for example, Hi, Bixby or Hi, Google) in a natural language form. For example, the NLG module 745 may generate information informing of completion of the control operation corresponding to the control command utterance indicating function execution or information (for example, feedback information for a user input) informing of a user's additional utterance input in a natural language form.

The TTS module 746 may perform processing such that data in a text form generated by the NLG module 545 is provided in a voice form.

The EPD module 747 may temporarily store the microphone signal in a memory (for example, the memory 530 of FIG. 5), monitor whether a user voice exists (voice active region) or does not exist (noise only or silence region) through a voice activity detection (VAD) technology corresponding to a voice detection function, and determine that the utterance ends when there is no voice for a predetermined time. The EPD module 747 may count a time on the basis of the identified user's voice utterance input. The EPD module 747 may start counting at a time point at which the voice input (for example, first voice input) is detected, record a time point at which the voice input ends since there is no voice input for a predetermined time, and generate information on a start time and an end time of the utterance input.

The voice agent 740 may provide result information of the second microphone signal processed through the modules to the recording module 720. For example, the voice agent 740 may provide at least one piece of wakeup utterance time information, utterance time/end point information, command control utterance time information, a TTS time, start and end information (TTS time, start/end point information), voice recognition result information (ASR results), or natural language result information (NLU results) (for example, private information) to the recording module 720 (or edit decision module 735).

The recording module 720 may include an app processing module (primary processing module) 725 for processing operations of an application based on recording execution and a post-processing edition module 730.

The app processing module 725 may process an audio signal or a video signal related to an application receiving a microphone input.

For example, when a camera app is executed in connection with recording, the app processing module 725 may process the first microphone signal acquired through the microphone, process a video signal acquired through a camera to generate recording data, and temporarily store the same in a buffer. In another example, when a voice recording app is executed in connection with recording, the app processing module 725 may process the first microphone signal acquired through the microphone to generate recording data and temporarily store the same in the buffer.

The app processing module 725 may perform processing such that information indicating recording is displayed on the user interface screen. The app processing module 725 may perform processing such that information (for example, an icon or an identifier) informing of activation of the voice agent 740 is provided on the user interface screen.

The post-processing edition module 730 may determine editing a section (for example, utterance input section or private information section) including unnecessary information in recording data generated by the app processing module 725, edit the unnecessary information, and generate edited recording data.

For example, the post-processing edition module 730 may include the speech enhancement module 733, an edit decision module 735, and an edit processing module 737.

The speech enhancement module 733 may process enhancement of a quality of a sound for recording data. For example, the speech enhancement module 733 may include at least one of an adaptive echo canceller (AEC) for removing echo, a noise suppression (NS) module, or an automatic gain control (AGC) module. The AEC may remove an echo signal on the basis of a reference signal (reference input) for the microphone signal. The NS module may distinguish between a voice component and a noise component and suppress background noise. The AGC module may control a volume of the voice signal. For example, the AGC module may control (for example, reduce) the size of a signal (for example, a signal in a user voice band) in a predetermined band through a high pass filter (HPF) (not shown).

The speech enhancement module 733 may transfer recording data having the enhanced sound quality to the edit processing module 737.

The edit decision module 735 may determine a section for editing unnecessary information in recording data on the basis of option information configured for the function of editing unnecessary information during recording and voice recognition result information transmitted from the voice recognition module.

The edit decision module 735 may compare the recording data with the voice processing result and identify at least one of a wakeup utterance section in which a voice is recognized, a control command utterance section, or a section including private information.

The edit decision module 735 may identify whether editing unnecessary information corresponds to automatic processing or user setting (manual) processing and may identify an editing processing scheme. For example, when the user configures to delete private information and voice command sections, the edit decision module 735 may determine the section including private information and the section including the voice command utterance as editing sections in the recording data. For example, when the user configures to delete the voice command section, the edit decision module 735 may determine only the section including the voice command utterance as the editing section in the recording data.

The edit decision module 735 may provide information on a start time and an end time of the editing processing section to the edit processing module 737. The edit decision module 735 may provide editing processing option information to the edit processing module 737.

The edit processing module 737 may generate edited recording data by editing the editing processing section determined by the edit decision module 735 in the recording data temporarily stored by the speech enhancement module 733. The edit processing module 737 may edit the recording data on the basis of at least one of an audio blocking scheme, an audio reduction scheme, an audio volume reduction scheme, or a scheme for removing all signals.

Figure 8:
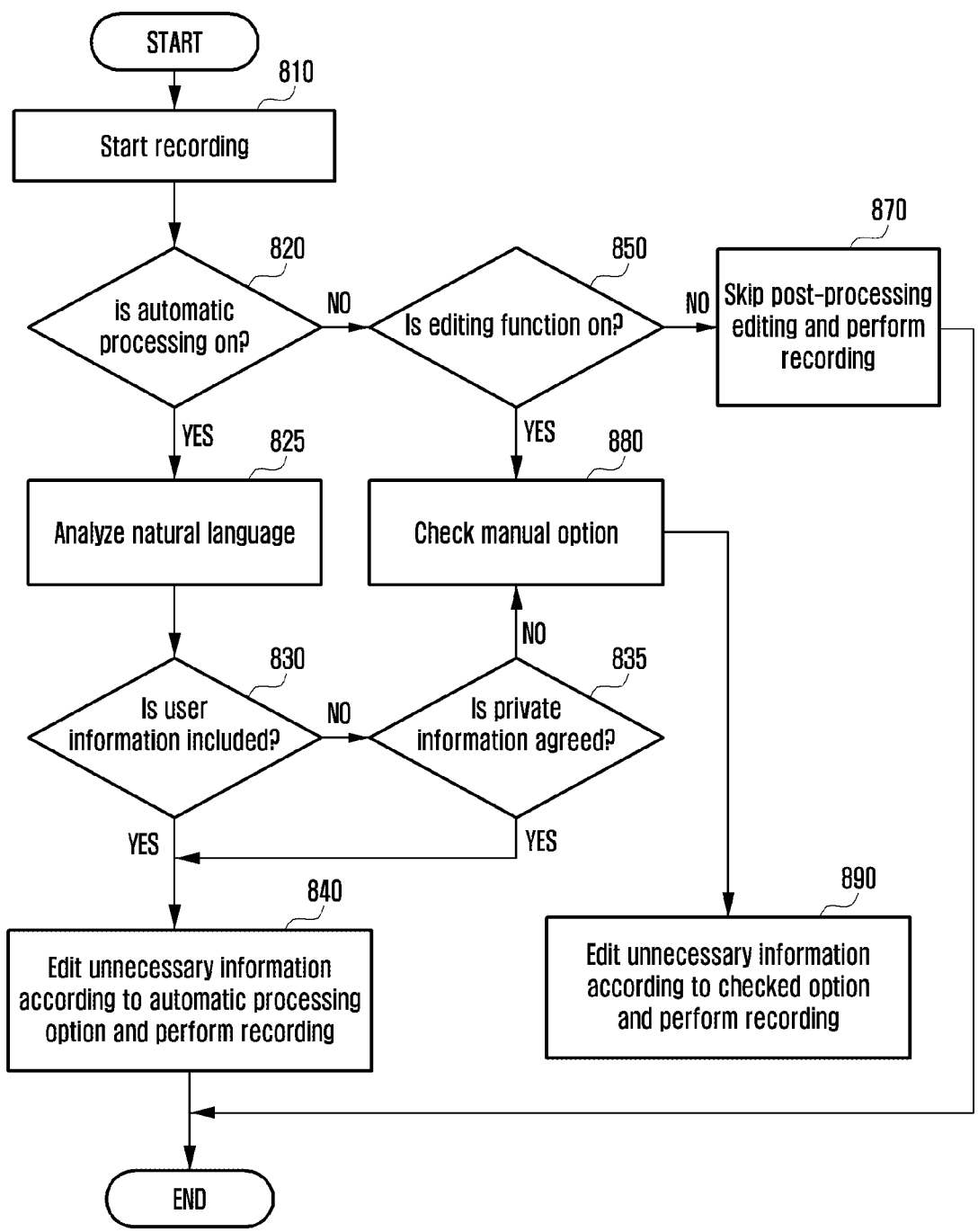
FIG. 8 is a flowchart illustrating an example method of processing recording and a voice input according to the configuration of the electronic device of FIG. 7 according to various embodiments.

FIG. 8 is a flowchart illustrating an example method of processing recording and a voice input according to the configuration of the electronic device of FIG. 7 according to various embodiments.

Referring to FIG. 8, according to an embodiment, a processor (for example, the processor 520 of FIG. 5) may receive a microphone signal in response to start of a recording operation in operation 810. The processor 520 may copy the microphone signal during recording, perform recording on the basis of a first microphone signal, and process voice recognition on the basis of a second microphone signal.

In operation 820, the processor 520 may identify whether the function of editing unnecessary information is configured as automatic processing. When automatic processing is configured ("Yes" of operation 820), the processor 520 may process voice recognition on the microphone signal (for example, the second microphone signal) and perform natural language analysis in operation 825.

In operation 830, the processor 520 may identify whether user information (or private information) is included in a voice utterance included in recording data. The user information may include, for example, at least one of a user name, identification information, a phone number, account information, or address information stored in the electronic device 101. According to an embodiment, the processor 520 may determine whether private information is included in the voice utterance in the recording data on the basis of a regular expression indicating user information (or user private information), a scheme such as natural language analysis (natural language processing (NLP)), or private information format data, but the scheme for determining private information is not limited thereto. The private information format data may be data related to a format in which private information is expressed or stored. For example, the private information format data may include an expression format of "*bank [0-9]+-[0-9]+-[0-9]" or an expression format of private information contained in an identity card. However, this is only an example, expression formats of private information in various forms may be included in private information format data.

When it is determined that the user information is included in the recorded voice utterance ("Yes" in operation 830), the processor 520 may edit the voice command and personal information in the recording data according to the automatic processing option and generate edited recording data in operation 840.

When automatic processing is not configured ("No" of operation 820), the processor 520 may determine whether the function of editing unnecessary information is activated during recording in operation 850. When the editing function is deactivated in operation 850 ("No" of operation 850), the processor 520 may skip post-processing editing and generate recording data in operation 870.

When the editing function is activated ("Yes" of operation 850), the processor 520 may check the configured manual option according to user settings since the user setting option is configured rather than automatic processing even though the function of editing unnecessary information is activated in operation 880. The electronic device 101 may support a configuration of the editing processing scheme. The editing processing scheme may include at least one of an audio blocking scheme, a voice reduction scheme, an audio volume reduction scheme, or a scheme for removing all signals.

In operation 890, the processor 520 may edit unnecessary information for the microphone signal through the option checked according to user settings to generate edited recording data.

When user information is not included in the recorded voice utterance or it is difficult to decide private information ("No" in operation 830), the processor 520 may identify whether consent to editing of private information is configured in the voice utterance in operation 835. When there is consent to editing of private information ("Yes" of operation 835), the processor 520 may process editing in the recording data to generate recording data in operation 840.

When there is no consent to editing of private information ("No" of operation 835), the processor 520 may guide the user to identify again whether to edit user information and identify the configured check option in operation 880. Thereafter, the processor 520 may process editing in the recording data to generate recording data in operation 890.

Figure 9:
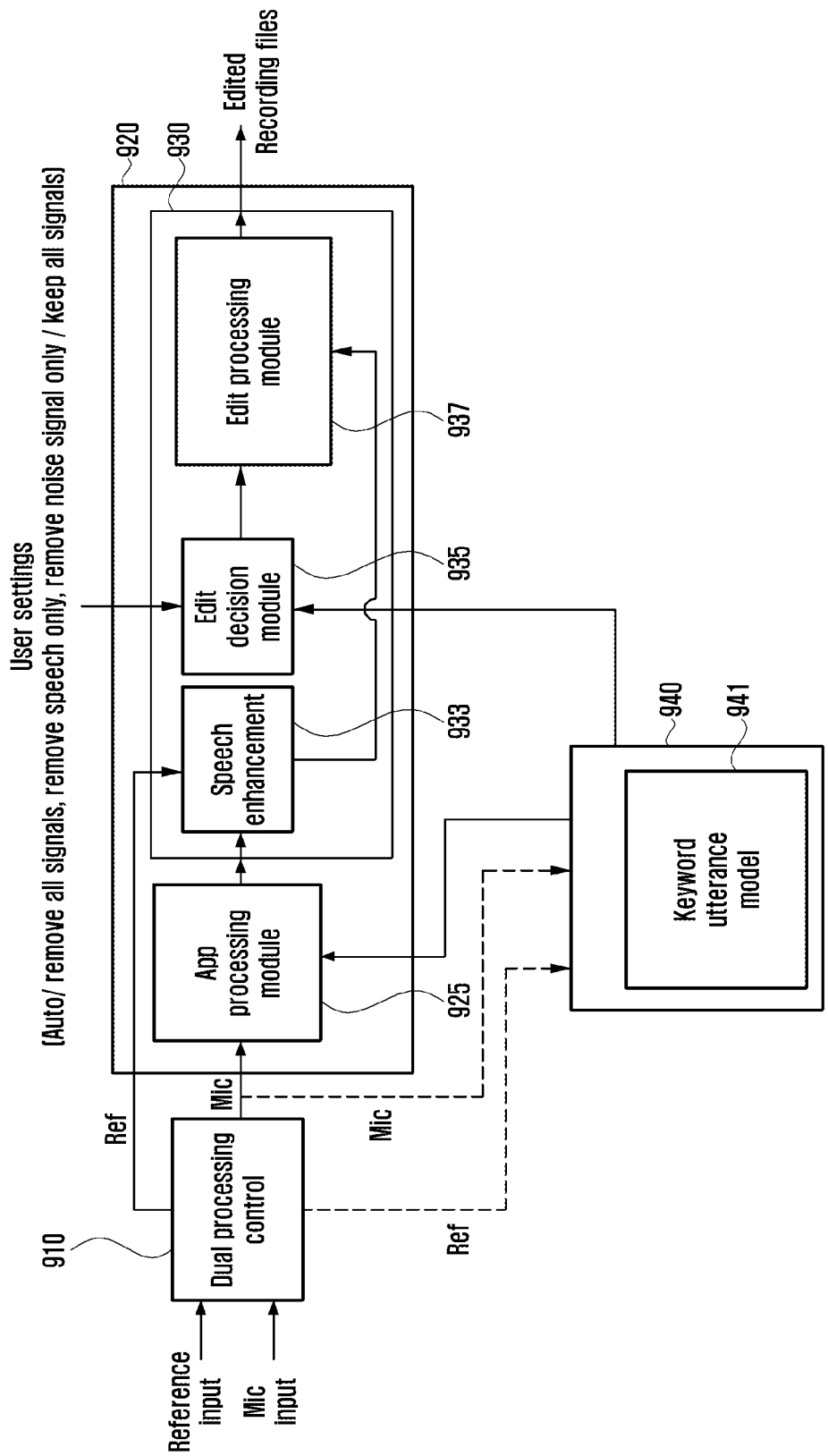
FIG. 9 is a block diagram illustrating an example configuration of an electronic device for processing recording and a voice input according to various embodiments.

FIG. 9 is a diagram illustrating an example configuration of an electronic device for processing recording and a voice input according to various embodiments.

Referring to FIG. 9, according to an embodiment, an electronic device (for example, the electronic device 101 of FIGS. 1 to 5) may include a processor (for example, the processor 520 of FIG. 5), a dual output module (dual output processing module) 910, a recording module 920, and a voice keyword recognition module 940. The dual output module (dual output processing module) 910 and the recording module 920 may perform the same function as that of the dual output module (dual output processing module) 710 and the recording module 720 of FIG. 7.

The processor 520 may transfer a microphone signal (mic input) to the dual output module 910 in response to start of a recording operation. The dual output module (dual output processing module) 910 may copy the microphone signal and process dual output.

The dual output module 910 may copy the signal transmitted from a microphone (for example, the microphone 510 of FIG. 5) and provide a first microphone signal (for example, first mic input) to the recording module 910 and a second microphone signal (for example, second mic input) to the voice keyword recognition module 940.

According to an embodiment, the dual output module 910 may copy a reference signal (for example, reference input) for performing voice processing on the signal transmitted from the microphone and provide a first reference signal to a speech enhancement module 933 and a second reference signal to a voice keyword recognition module 940.

The voice keyword recognition module 940 may process the second microphone signal and recognize a keyword voice utterance. The voice keyword recognition module 940 may include a keyword utterance model 941. According to an embodiment, a keyword utterance model 941 may be a voice recognition model implemented to recognize a preset keyword voice utterance (for example, recoding a video). The voice keyword recognition module 940 may detect a preset keyword in the second microphone signal on the basis of the keyword utterance model 941 and recognize the recognized keyword command utterance. The voice keyword recognition module 940 may provide voice recognition-processed result information to the recording module 920. The voice keyword recognition module 940 may provide at least one of keyword command utterance information (text), an utterance time (start and end time), and utterance start/end point information to the recording module 920 (or edit decision module 935).

The recording module 920 may include an app processing module (primary processing module) 925 for processing operations of an application based on recording execution and a post-processing edition module 930.

The app processing module 925 may process an audio signal or a video signal related to an application receiving a microphone input. The post-processing edition module 930 may determine an editing section (for example, an utterance input section or a private information section) including unnecessary information in recording data generated by the app processing module 925, edit the unnecessary information, and generate edited recording data. For example, the post-processing edition module 930 may include the speech enhancement module 933, an edit decision module 935, and an edit processing module 937.

The speech enhancement module 933 may process enhancement of a quality of a sound for recording data. For example, the speech enhancement module 933 may include at least one of an adaptive echo canceller (AEC) for removing echo, a noise suppression (NS) module, or an automatic gain control (AGC) module. The AEC may remove an echo signal on the basis of a reference signal (reference input) for the microphone signal. The NS module may distinguish between a voice component and a noise component and suppress background noise. The AGC module may control a volume of the voice signal.

The speech enhancement module 933 may transfer recording data having the enhanced sound quality to the edition processing module 937.

The edit decision module 935 may determine a section for editing unnecessary information in recording data on the basis of option information configured for the function of editing unnecessary information during recording and voice recognition result information transmitted from the voice keyword recognition module 940.

The edit decision module 935 may compare the recording data with the voice processing result and identify at least one of a wakeup utterance section in which a voice is recognized, a control command utterance section, or a section including private information.

The edit decision module 935 may identify whether editing unnecessary information corresponds to automatic processing or manual processing and may identify an editing processing scheme. For example, when the user configures to delete private information and voice command sections, the edit decision module 935 may determine the section including private information and the section including the voice command utterance as editing sections in the recording data. For example, when the user configures to delete the voice command section, the edit decision module 935 may determine only the section including the voice command utterance as the editing section in the recording data.

The edit decision module 935 may provide information on a start time and an end time of the editing processing section to the edit processing module 937. The edit decision module 935 may provide editing processing option information to the edit processing module 937.

The edit processing module 937 may generate edited recording data by editing the editing processing section determined by the edit decision module 935 in the recording data temporarily stored by the speech enhancement module 933. The edit processing module 937 may edit the recording data on the basis of at least one of an audio blocking scheme, an audio reduction scheme, an audio volume reduction scheme, or a scheme for removing all signals.

Figure 10:
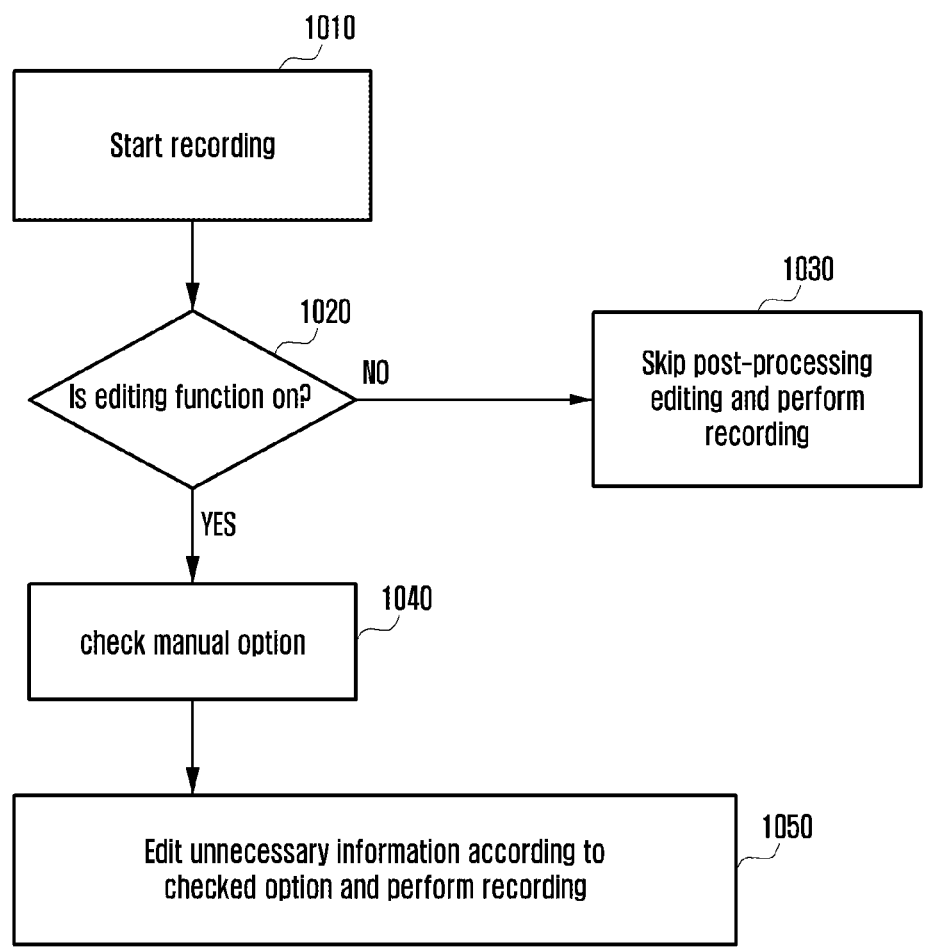
FIG. 10 is a flowchart illustrating an example method of processing recording and a voice input according to the configuration of the electronic device of FIG. 9 according to various embodiments.

FIG. 10 is a flowchart illustrating an example method of processing recording and a voice input according to the configuration of the electronic device of FIG. 9 according to various embodiments.

Referring to FIG. 10, according to an embodiment, a processor (for example, the processor 520 of FIG. 5) may receive a microphone signal in response to start of a recording operation in operation 1010.

In operation 1020, the processor 520 may determine whether the function of editing unnecessary information is activated during recording. When the editing function is deactivated ("No" of operation 1020), the processor 520 may skip post-processing editing and generate recording data in operation 1030.

When the editing function is activated ("Yes" of operation 1020), the processor 320 may check a configured manual option according to user settings in operation 1040. The electronic device 101 may support a configuration of the editing processing scheme. The editing processing scheme may include at least one of an audio blocking scheme, a voice reduction scheme, an audio volume reduction scheme, or a scheme for removing all signals. The electronic device 101 may support a configuration of whether private information is edited.

In operation 1050, the processor 520 may edit unnecessary information for the microphone signal through the option checked according to settings and generate edited recording data.

Figure 11:
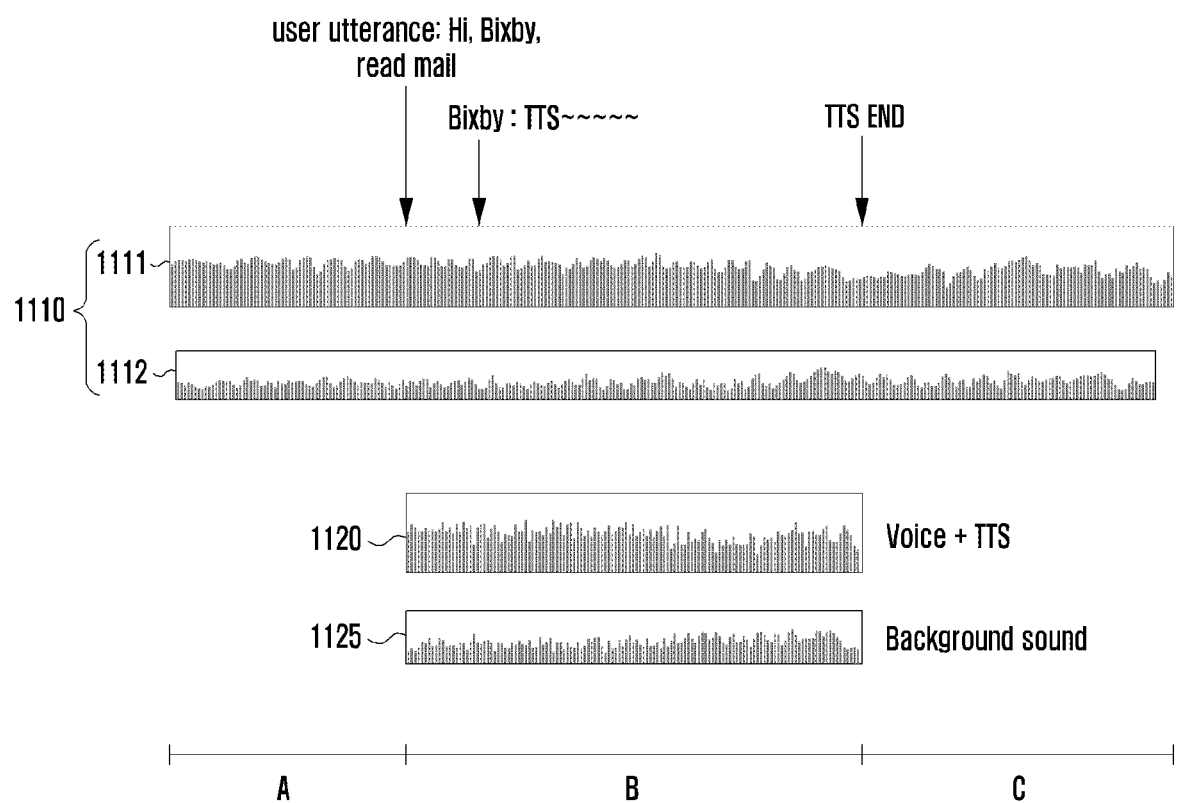
FIG. 11 is a diagram illustrating an example of processing recording and a voice input according to various embodiments.

FIG. 11 is a diagram illustrating an example of processing recording and a voice input according to various embodiments.

Referring to FIG. 11, the electronic device 101 according to an embodiment may actually simultaneously perform a recording processing operation and a voice recognition operation, edit unnecessary information in recording data, and store the edited recording data.

The electronic device 101 may record the microphone signal in response to start of voice recording and generate recording data 1110 having a predetermined length. The recording data 1110 may include audio data 1111 separated as a voice signal and audio data 1112 separated as a background sound. The recording data 1110 may be recording data temporarily stored by the recording module.

The electronic device 101 may perform voice recognition processing on the microphone signal while recording the microphone signal and recognize an utterance for calling a voice assistant or an utterance input for instructing function control in the microphone signal.

The user may speak "Hi, Bixby (or wakeup utterance), read mail (or control command utterance) while recording a voice. The electronic device 101 may recognize the voice input for "Hi, Bixby, read mail" during recording and control mail function to convert the content of the mail into a voice.

The electronic device 101 may determine a voice utterance section and a section in which mail is processed as sections for editing unnecessary information during recording. For example, the electronic device 101 may determine a section (B) from a time point at which the utterance of "Hi, Bixby, read mail" is made to a time point at which mail TTS is output and ends as the unnecessary editing section.

The electronic device 101 may edit voice data 1120 and background sound data 1125 for the section B to generate edited recording data without performing editing for a section A and a section C in the whole recording data A, B, and C.

For example, the electronic device 101 may process editing on the basis of at least one of an audio blocking scheme for maintaining the length of the whole recording data but muting both the voice and the background sound in the section B, a voice reduction scheme for maintaining the length of the whole recording data but reducing a volume and maintaining the background sound in the section B, an audio volume reduction scheme for maintaining the length of the whole recording data but reducing volumes of both the voice and the background sound in the section B, or a scheme for removing both the voice and the background sound in the section B in the whole recording data.

Figure 12A:
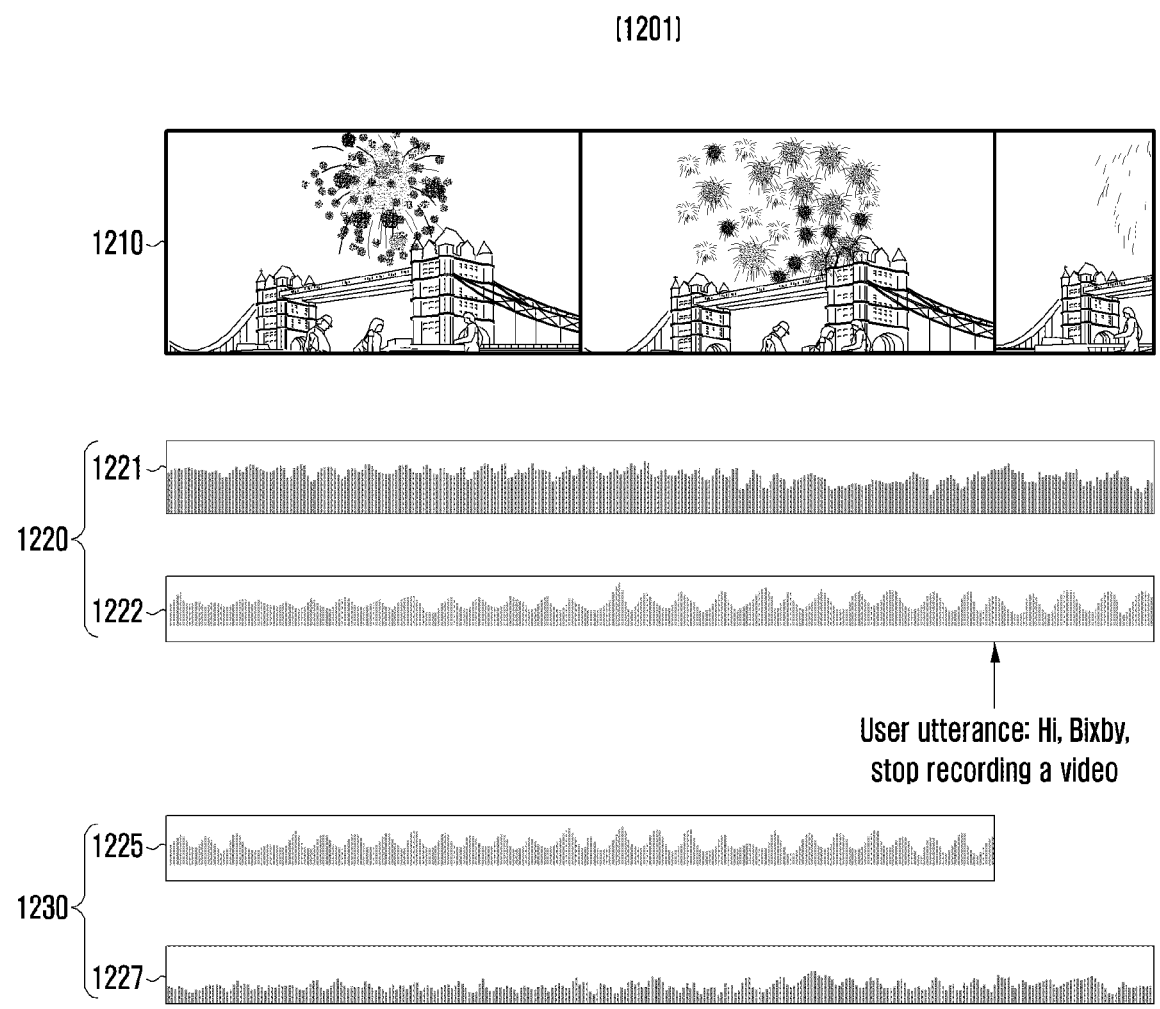
FIG. 12A is a diagram illustrating an example of processing recording and a voice input according to various embodiments.
Figure 12B:
FIG. 12B is a diagram illustrating an example of processing recording and a voice input according to various embodiments.
Figure 12B:
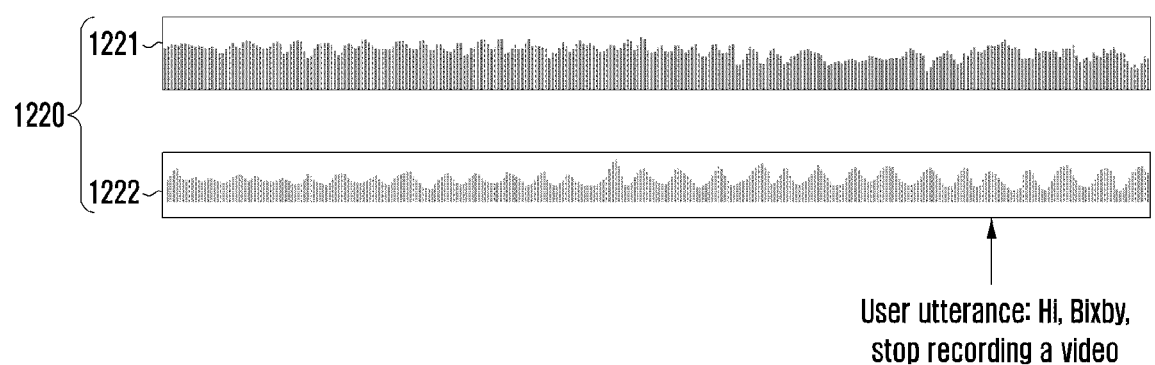
Figure 12B:
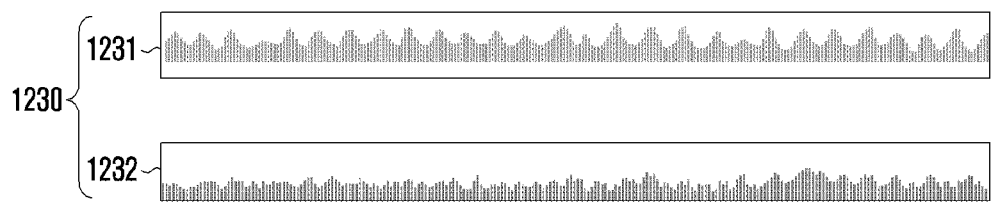
Figure 12B:

FIG. 12A is a diagram illustrating an example of processing recording and a voice input according to various embodiments, and FIG. 12B is a diagram illustrating an example of processing recording and a voice input according to various embodiments.

In FIGS. 12A and 12B, the electronic device 101 according to an embodiment may simultaneously perform a recording processing operation and a voice recognition operation, edit unnecessary information in recording data, and store the edited recording data.

The electronic device 101 may record a microphone signal and a video signal in response to start of video recording and generate recording data 1210 and 1220 having a predetermined length. The recording data 1210 and 1220 may include video data 1210 and audio data 1220. For example, the audio data 1220 may include audio data of a voice signal 1221 and audio data of a background sound 1222.

The electronic device 101 may perform voice recognition processing on the microphone signal during video recording and recognize an utterance for calling a voice assistant and an utterance input for instructing function control in the microphone signal.

The user may speak an utterance of "Hi, Bixby (or wakeup utterance), stop recording a video (or control command utterance)" during video recording. The electronic device 101 may recognize a voice input for "Hi, Bixby, stop recording a video" during recording and control a camera application in response to the voice input to end the video recording and generate video recording data.

The electronic device 101 may determine a voice input utterance section as a section for editing unnecessary information in the recording data. For example, the electronic device 101 may determine a section from a time point at which the utterance of "Hi, Bixby, stop recording a video" is made to a time point at which recording ends as the unnecessary editing section.

The electronic device 101 may edit the editing section in the whole video recording data and generate edited video recording data 1230.

For example, as indicated by reference numeral 1201, the electronic device 101 may process editing such that voice data 1225 of the voice utterance input is blocked (muted) and background sound data 1227 is maintained. At this time, the video data 1210 may be maintained.

In another example, as indicated by reference numeral 1202, the electronic device 101 may generate edited data 1231 and 1232 deleted from the voice data 1221 and the background sound data 1222 of the voice utterance input and generate edited data 1215 deleted from the video data 1210 from a time point at which the voice utterance input starts to a time point at which the input ends to generate edited video recording data.

According to various example embodiments, a method of processing recording and a voice input by an electronic device (for example, the electronic device 101 of FIG. 1, the UE 200 of FIG. 2, or the electronic device 101 of FIG. 5) may include: copying a signal acquired from the microphone, recording a first signal, and performing voice recognition on a second signal based on a recording operation using the microphone (for example, the microphone 510 of FIG. 5) being executed, determining an editing section including unnecessary information in the first signal based on a voice recognition result for the second signal, editing the unnecessary information included in the determined editing section in the first signal, and storing the edited recording data.

According to various example embodiments, the editing section including the unnecessary information may include at least one of a wakeup utterance input section, a control command utterance input section, and a private information utterance section.

According to various example embodiments, the recording operation may include at least one of an audio recording operation or a video recording operation.

According to various example embodiments, the operation of determining the editing section may include: comparing recording data generated on the basis of the first signal with voice recognition result information processed on the basis of the second signal, identifying at least one of a wakeup utterance section, a control command utterance section, or a section including private information in the recording data, and determining the editing section.

According to various example embodiments, the method may further include: providing an item supporting activation and deactivation of a function of editing unnecessary information to a user interface screen, and the unnecessary information may be edited in response to an input for making a request for activating the function of editing the unnecessary information.

According to various example embodiments, the operation of editing the unnecessary information may include: maintaining a total length of the first signal and muting both a voice and a background sound in an editing section including unnecessary information.

According to various example embodiments, the operation of editing the unnecessary information may include: maintaining a total length of the first signal but reducing a volume of a voice signal and maintaining a background sound or reducing volumes of the voice signal and the background sound in a section including unnecessary information in the first signal.

According to various example embodiments, the operation of editing the unnecessary information may include: performing editing by deleting data in the editing section including the unnecessary information from a total length of the first signal.

According to various example embodiments, the operation of editing the unnecessary information may include: providing a user interface screen related to a configuration for editing the unnecessary information to a display, and editing the editing section including the unnecessary information in the first signal through an editing processing scheme selected by a user input.

According to various example embodiments, the operation of editing the unnecessary information may include: displaying a guidance user interface for selecting approval or rejection of editing of the unnecessary information in response to reception of a recording end request, and the unnecessary information is edited in the first signal in response to reception of an editing approval input.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a microphone;
a memory; and
a processor,
wherein the memory stores instructions which, when executed, cause the processor to:
store and record, when executing a recording operation, a first signal acquired from the microphone, and generate a second signal by copying the first signal,
perform voice recognition on the second signal,
identify an utterance section including specific information in the second signal based on a voice recognition result for the second signal,
determine an editing section in the stored first signal corresponding to the utterance section, and
generate recording data by editing the editing section in the stored first signal.

2. The electronic device of claim 1, wherein the editing section including the unnecessary information includes at least one of a wakeup utterance input section, a control command utterance input section, and a private information utterance section.

3. The electronic device of claim 1, wherein the recording operation includes at least one of an audio recording operation or a video recording operation.

4. The electronic device of claim 1, wherein the memory further includes instructions which, when executed, cause the processor to: provide a configuration object supporting activation and deactivation of a function of editing unnecessary information to a user interface screen.

5. The electronic device of claim 1, wherein the memory further includes instructions which, when executed, cause the processor to: perform editing such that a total length of the first signal is maintained and both a voice and a background sound in the editing section including unnecessary information are muted and both a voice and a background sound in the desired section are not muted.

6. The electronic device of claim 1, wherein the memory further includes instructions which, when executed, cause the processor to: perform editing such that a total length of the first signal is maintained and a volume of a voice signal and a background sound are maintained in the desired section, but a volume of a voice signal is reduced and a background sound is maintained in the editing section including unnecessary information in the first signal.

7. The electronic device of claim 1, wherein the memory further includes instructions which, when executed, cause the processor to: perform editing such that a total length of the first signal is maintained and volumes of a voice signal and a background sound are maintained in the desired section, and volumes of a voice signal and a background sound are reduced in the editing section including unnecessary information in the first signal.

8. The electronic device of claim 1, wherein the memory further includes instructions which, when executed, cause the processor to: perform editing such that all pieces of data in the editing section including the unnecessary information are deleted from a total length of the first signal and the desired section is maintained in the first signal.

9. The electronic device of claim 1, wherein the memory further includes instructions which, when executed, cause the processor to: provide a user interface screen related to a configuration for editing the unnecessary information to a display, and
edit the unnecessary information in the determined editing section in the first signal through an editing processing scheme selected by a received input.

10. The electronic device of claim 1, wherein the memory further includes instructions which, when executed, cause the processor to: control a display to display a guidance user interface for selecting approval or rejection of editing of the unnecessary information in response to reception of a recording end request, and
edit the unnecessary information in the first signal in response to reception of an editing approval input.

11. A method of processing recording and a voice input by an electronic device, the method comprising:
storing and recording a first signal acquired from the microphone and generating second signal by copying the first signal based on a recording operation being executed;
performing voice recognition on the second signal;
identifying an utterance section including specific information in the second signal based on a voice recognition result for the second signal;
determining an editing section in the stored first signal corresponding to the utterance section; and
storing recording data by editing the editing section in the stored first signal.

12. The method of claim 11, wherein the editing section including the unnecessary information includes at least one of a wakeup utterance input section, a control command utterance input section, and a private information utterance section.

13. The method of claim 11, wherein the recording operation includes at least one of an audio recording operation or a video recording operation.

14. The method of claim 11, wherein the determining of the editing section further comprises: comparing recording data generated, based on the first signal, with voice recognition result information processed, based on the second signal, identifying at least one of a wakeup utterance section, a control command utterance section, or a section including private information in the recording data, and determining the editing section.

15. The method of claim 11, further comprising: providing a configuration item supporting activation and deactivation of a function of editing unnecessary information to a user interface screen,
   wherein the unnecessary information is edited in response to an input for making a request for activating the function of editing the unnecessary information.

16. The method of claim 11, wherein the editing of the unnecessary information comprises: performing editing such that a total length of the first signal is maintained and both a voice and a background sound in the editing section including unnecessary information are muted and both a voice and a background sound in the desired section are not muted.

17. The method of claim 11, wherein the editing of the unnecessary information comprises: performing editing such that a total length of the first signal is maintained and a volume of a voice signal and a background sound are maintained in the desired section, and a volume of a voice signal is reduced and a background sound is maintained or volumes of the voice signal and the background sound are reduced in the editing section including unnecessary information in the first signal.

18. The method of claim 11, wherein the editing of the unnecessary information comprises performing editing such that whole data in the editing section including the unnecessary information is deleted from a total length of the first signal and the desired section is maintained in the first signal.

19. The method of claim 11, wherein the editing of the unnecessary information comprises: providing a user interface screen related to a configuration for editing the unnecessary information to a display, and
   editing the editing section including the unnecessary information in the first signal through an editing processing scheme selected by a received input.

20. The method of claim 11, wherein the editing of the unnecessary information further comprises: displaying a guidance user interface for selecting approval or rejection of editing of the unnecessary information in response to reception of a recording end request, and
   the unnecessary information is edited in the first signal in response to reception of an editing approval input.

\* \* \* \* \*